US008632407B2

(12) United States Patent
Gelman

(10) Patent No.: US 8,632,407 B2
(45) Date of Patent: Jan. 21, 2014

(54) GENERAL GAMING ENGINE

(75) Inventor: Geoffrey M. Gelman, New York, NY (US)

(73) Assignee: CFPH, LLC, New York, NY (US)

( * ) Notice: Subject to any disclaimer, the term of this patent is extended or adjusted under 35 U.S.C. 154(b) by 1603 days.

(21) Appl. No.: 11/832,256

(22) Filed: Aug. 1, 2007

(65) Prior Publication Data

US 2009/0036188 A1 Feb. 5, 2009

(51) Int. Cl.
*G06F 17/00* (2006.01)

(52) U.S. Cl.
USPC .................................. 463/42; 463/40; 463/41

(58) Field of Classification Search
USPC ...................................................... 463/40–42
See application file for complete search history.

(56) References Cited

U.S. PATENT DOCUMENTS

| | | | |
|---|---|---|---|
| 4,403,777 | A | 9/1983 | Del Principe et al. |
| 4,527,798 | A | 7/1985 | Siekierski et al. |
| 4,636,951 | A | 1/1987 | Harlick |
| 4,692,863 | A | 9/1987 | Moosz |
| 4,856,787 | A | 8/1989 | Itkis |
| 4,858,122 | A | 8/1989 | Kreisner |
| 5,042,809 | A | 8/1991 | Richardson |
| 5,046,738 | A | 9/1991 | Coates |
| 5,048,833 | A | 9/1991 | Lamle |
| 5,072,381 | A | 12/1991 | Richardson et al. |
| 5,112,050 | A | 5/1992 | Koza et al. |
| 5,326,104 | A | 7/1994 | Pease |
| 5,330,185 | A | 7/1994 | Wells |
| 5,351,970 | A | 10/1994 | Fioretti |
| 5,356,144 | A | 10/1994 | Fitzpatrick et al. |
| 5,398,932 | A | 3/1995 | Eberhardt et al. |
| 5,415,416 | A | 5/1995 | Scagnelli et al. |
| 5,417,424 | A | 5/1995 | Snowden et al. |
| 5,476,259 | A | 12/1995 | Weingardt |
| 5,588,913 | A | 12/1996 | Hecht |
| 5,592,609 | A | 1/1997 | Suzuki et al. |
| 5,707,286 | A | 1/1998 | Carlson |
| 6,210,274 | B1 | 4/2001 | Carlson |
| 6,428,413 | B1 | 8/2002 | Carlson |
| 7,637,810 | B2 * | 12/2009 | Amaitis et al. .................. 463/25 |

(Continued)

OTHER PUBLICATIONS

PCT Search Report and Written Opinion for International Application PCT/US08/71411; 9 pages.

(Continued)

*Primary Examiner* — Michael Cuff

(57) ABSTRACT

An apparatus for implementing a game having a deterministic component and a non-deterministic component wherein a player uses the game through at least one player interface unit. Each player interface unit generates a player record indicating player-initiated events. A random number generator provides a series of pseudo-random numbers and a rules library stores indexed rules for one or more games. An interface registry stores mapping records where the mapping records are used to associate the player-initiated events to pre-selected rules in the rules library. A control means is coupled to the player interface to receive the output of the player interface unit, coupled to the interface registry, the rules library, and the random number generator. The control means processes the player record and returns an output record to the player interface unit where the output record is determined by executing the game's rules with reference to the pseudo-random numbers and predefined combinatorial algorithms for selecting sets of the pseudo-random numbers. In various embodiments, random numbers may be generated for use in a particular game or set of games, but not for use in all games.

16 Claims, 9 Drawing Sheets

(56) References Cited

U.S. PATENT DOCUMENTS

| | | | | |
|---|---|---|---|---|
| 7,747,293 | B2 * | 6/2010 | Sutardja | 455/574 |
| 8,118,681 | B2 * | 2/2012 | Mattice et al. | 463/46 |
| 8,216,056 | B2 * | 7/2012 | Lutnick et al. | 463/22 |
| 8,226,474 | B2 * | 7/2012 | Nguyen et al. | 463/29 |
| 2005/0193209 | A1 | 9/2005 | Saunders et al. | |
| 2007/0243928 | A1 * | 10/2007 | Iddings | 463/26 |
| 2007/0265089 | A1 * | 11/2007 | Robarts et al. | 463/42 |
| 2008/0139306 | A1 * | 6/2008 | Lutnick et al. | 463/30 |
| 2008/0146344 | A1 * | 6/2008 | Rowe et al. | 463/42 |

OTHER PUBLICATIONS

Website: "SG 100 TRNG", (http://www.protego.se/sg100_en.htm), download date: Aug. 16, 2007.

International Preliminary Report for International Application No. PCT/US08/71411, dated Feb. 2, 2010 (6 pages).

* cited by examiner

GENERAL GAMING ENGINE

BACKGROUND OF THE INVENTION

1. Field of the invention

The present invention relates, in general, to gaming machines, and, more particularly, to an electronic gaming engine supporting multiple games and multiple users.

2. Statement of the Problem

Casino gaming has grown rapidly in the United States. Casino gaming is experiencing similar growth throughout the world. An important segment of this developing industry is electronic games. An electronic implementation of a game requires a method for interpreting human actions as they occur within the constraints of the rules as well as the ability to respond with chance events.

Microprocessors allow games that formerly relied on analog devices for generating chance events, such as dice, to be simulated digitally. Simulating a die roll with a computer would seem to be a contradiction because the microprocessor is the embodiment of logic and determinism. With care, however, it is possible to create deterministic algorithms that produce unpredictable, statistically random numbers.

Contemporary games consist of a framework of rules that define the options for how a user or random event generator may change the game state. Play begins with an initial state. Subsequent play consists of user initiated events that trigger the execution of one or more rules. A rule may proceed deterministically or non-deterministically.

Typical games consist of deterministic and non-deterministic rules. A game progresses by the interaction of these rules. There are two sources for non-determinism player decisions and chance events. In the game of Poker, for example, deciding to replace three instead of two cards in a hand is a player decision that is limited, but not predetermined, by rules. The rules limit the range of options the player has, but within that set of options the player is free to choose. An example of a chance event is the random set of cards received by the poker player. Shuffled cards do not produce a predictable hand.

Other examples that illustrate determinism and non-determinism in gaming are popular casino pastimes such as Blackjack, Keno, and Slot machines. The first Blackjack hand a player receives is two cards from a shuffled deck. The number of cards dealt is two, but the cards could be any from the deck. Keno is essentially a lottery. In Keno, a player attempts to guess twenty balls chosen from a basket of eighty balls. The rules dictate that to participate, a player must fill out a Keno ticket indicating the balls he believes will be chosen in the next round. The selection of balls, however, is a purely random event. Slot machines require the player to pull a handle for each round. Slot wheels stop at random positions.

The non-deterministic problem in most parlor games is random sampling without replacement: given a set of n elements, randomly choose m of them without replacement where m is less than or equal to n. Although sampling without replacement covers most popular games, it would be easy to conceive of games that required replacement. For example, consider a variant of Keno that replaces each chosen ball before selecting the next ball. Until now, no device is available that services the needs of multiple games by providing algorithms for sampling with and without replacement as well as others such as random permutation generation, sorting, and searching.

A casino player must know the likelihood of winning a jackpot is commensurate with the stated theoretical probabilities of the game. Moreover, the casino would like to payout as little as possible while maximizing the number of their game participants. Because each game sponsored by a casino has a built-in theoretical edge for the house, over time and with repeated play, the house will make money. In other words, the casino does not need to cheat the customer because it has a built-in edge. The customer, who is at a disadvantage in the long run, will want to know the game is fair in order to manage risk. In is a theoretical fact that bold wagering in Roulette increases a players odds of winning. A player who cannot know the odds of winning cannot formulate a strategy.

Provided that the deterministic rules of a game are implemented correctly, it is essential that the chance events of a game are indeed random. An important subproblem for generating random events is uniform random number generation. If the underlying uniform random number generator does not generate statistically independent and uniform pseudo-random numbers, then either the house or customer will be at a disadvantage. A poorly designed system might favor the house initially and over time turn to favor the player. Certainly the house would not want this situation because it makes revenue projection impossible. Any regulatory body would like to ensure that neither the house nor customer have an advantage beyond the stated theoretical probabilities of the game. In the context of fairly implemented rules, the only way for the house to increase its revenue is to increase the number of players participating in their games.

Typically, an engineer creating an electronic game generates a flow chart representing the rules and uses a random number generator in conjunction with combinatorial algorithms for generating chance events. Representing rules is one problem. Generating chance events to support those rules is another. Creating pseudo-random numbers is a subtle problem that requires mathematical skills distinct from other problems of gaming. In other words, a skilled game programmer may be unable to solve the problems of developing a proper random number generator. Even if given a quality random number generator, problems can occur in hardware implementations that render the generator predictable. One example is using the same seed, or initial state, for the generator at regular intervals and repeatedly generating a limited batch of numbers. Without attending to the theoretical aspects of a uniform random number generator, it is not possible to implement the rules of a game perfectly. The result is a game unfair to the house, players, or both. Hence, there is a need for a gaming system, apparatus, and method that separate the problem of implementing game rules from that of random event generation.

The need for such a device is also evident at the regulatory level. Gaming is a heavily regulated industry. States, tribes, and the federal government have gaming regulatory agencies at various levels to ensure fairness of the games. The gaming regulatory authority certifies that a particular implementations of a game reflects the underlying probabilities. Because electronic games are implemented in often difficult to understand software, the problem of verifying fairness of a game is challenging. Further, there is little uniformity in the implementation of fundamental components of various games. To determine fairness, the gaming authority subjects each game to a battery of tests. No set of statistical tests performed on a limited portion of the random number generator period can ensure that the generator will continue to perform fairly in the field. The process of testing is both expensive and of limited accuracy. Hence, a regulatory need exists for a uniform, standardized method of implementing games that reduce the need and extent of individual game testing while increasing the reliability of detecting and certifying game fairness.

3. Solution to the Problem

The Universal Gaming Engine (UGE) in accordance with the present invention is a gaming apparatus providing a consistent game development platform satisfying the needs of the gaming authority, house, player, and game developer. The UGE separates the problems of developing game rules from the difficulty of producing chance events to support those rules. Functions that are common to a number of games are included in the gaming engine so that they need not be implemented separately for each game. By including basic functions shared by a number of games, hardware costs are greatly reduced as new games can be implemented merely by providing a new set of rules in the rules library and the basic hardware operating the game remains unchanged.

SUMMARY OF THE INVENTION

Briefly stated, the present invention provides a system, apparatus, and method for implementing a game having a deterministic component and a non-deterministic component wherein a player uses the game through at least one player interface unit. Each player interface unit generates a player record indicating player-initiated events. A random number generator provides a series of pseudo-random numbers that are preferably statistically verified by integral verification algorithms and stored in a buffer. Preferably, the random number generator allows seed and key restoration automatically or manually upon power fault.

A rules library stores indexed rules for one or more games. An interface registry stores mapping records where the mapping records are used to associate the player-initiated events to pre-selected rules in the rules library. A control means is coupled to receive the output of the player interface unit, coupled to the interface registry, the rules library, and the random number generator. The control means processes the player record and returns an output record to the player interface unit where the output record is determined by executing the game's rules with reference to the pseudo-random numbers and predefined combinatorial algorithms for selecting sets of the pseudo-random numbers.

DETAILED DESCRIPTION OF THE DRAWING

1. Overview

Figure 1:
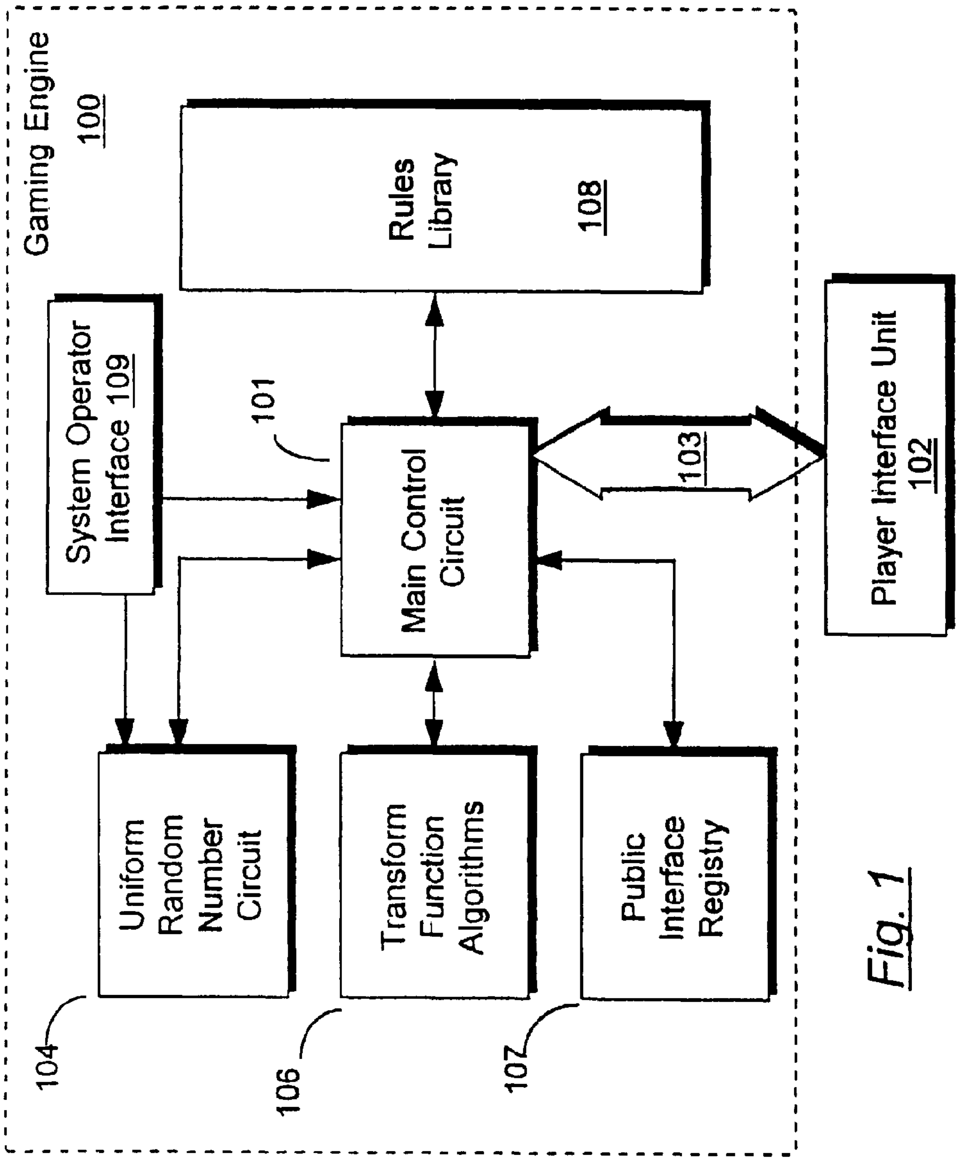
FIG. 1 illustrates a simplified block diagram of the gaming engine in accordance with the present invention.

FIG. 1 illustrates, in simplified schematic form, a gaming apparatus in accordance with the present invention. The gaming apparatus in accordance with the present invention is also referred to as a "universal gaming engine" as it serves in some embodiments as a platform for implementing any number of games having deterministic and random components. In other embodiments, the universal gaming engine in accordance with the present invention provides a platform that supports multiple players across a network where each player preferably independently selects which game they play and independently controls progression of the game.

Although in the preferred embodiment all of the games discussed are implemented entirely electronically, it is a simple modification to alter the player interface to include mechanical switches, wheels, and the like. Even in mechanically implemented games electronic functions that are performed by the gaming engine in accordance with the present invention are required. Hence, these mechanical machines are greatly simplified using the gaming engine in accordance with the present invention.

Gaming engine 100 is illustrated schematically in FIG. 1, including major subsystems in the preferred embodiments. Each of the subsystems illustrated in FIG. 1 is described in greater detail below. FIG. 1, however, is useful in understanding the overall interconnections and functioning of the gaming engine in accordance with the present invention.

Gaming engine 100 performs several basic functions common to many electronically implemented casino games. The most basic of these functions includes interacting with the player to detect player initiated events, and to communicate the state of a game to the player. Gaming engine 100 must process the player initiated event by determining the appropriate rules of the game that must be executed and then executing the appropriate rules. Execution of the rules may require only simple calculation or retrieving information from memory in the case of deterministic rules, or may require access to pseudo-random values or subsets of pseudo-random values in the case of non-deterministic components.

Gaming engine 100 in accordance with the present invention uses a main control circuit 101 to control and perform basic functions. Main control circuit 101 is a hardware or software programmable microprocessor or microcontroller. Alternatively, main control circuit 101 can be implemented as an ASIC device with dedicated logic to perform the required control functions. Main control circuit 101 communicates with player interface unit 102 via interface bus 103. Player interface unit 102 is a machine having at least some form of display for communicating information to the player and some form of switch (i.e., buttons, levers, keyboard, coin slot, or the like) for communicating information from the player.

Player interface unit 102 generates a player record of information and transmits the player record over bus 103 to main control circuit 101. The player record of information contains information about the player initiated event as well as any data that may be associated with the particular event. For example, a player initiated event may be drawing two cards from a deck of cards. The player record will include information about the event (i.e., drawing cards), and data (i.e., two cards). The player record may include other information such as the state of the game that is being played. By "state of the game" it is meant at which stage in the rule defined progression of the game the game currently exists. State information may be maintained by gaming engine 100 or player interface unit 102, or both.

Main control circuit 101 responds to a player initiated event by referencing a public interface registry 107. Public interface registry 107 is essentially a lookup table implemented in volatile, semi-volatile, or non-volatile memory. Public interface registry 107 is desirably organized as an addressable memory where each address is associated with a mapping record. Main control circuit 101 uses the player event portion of the player record to address public interface registry 107 in a preferred embodiment. Public interface registry 107 then provides a selected mapping record to main control circuit 101. Main control circuit 101 uses the selected mapping record to address rules library 108.

Rules library 108 is essentially an addressable memory preferably allowing random access. Rules library 108 can be implemented in volatile, semi-volatile, or non-volatile memory of any convenient organizational structure. Rules library 108 responds to the address from main control circuit 101 by supplying one or more rules, which correspond to game rules, to main control circuit 101. The rules provided by rules library 101 are preferably executable instructions for main control circuit 101.

Main control circuit 101 processes the selected rules by selectively accessing random number circuit 104 and transform function algorithms 106. As set out herein before, completely deterministic rules may be executed entirely within main control circuit 101 by simple calculations or data transfer operations. Where the selected rule requires main control circuit 101 to access one or more pseudo-random numbers, random number circuit 104 is accessed. In the preferred embodiment random number circuit 104 provides a series of pseudo-random numbers of arbitrary length having uniform distribution as described in greater detail hereinafter.

Often times, however, a rule will require a non-uniform distribution of pseudo-random numbers, or some subset of a series of pseudo-random numbers. In this case, main control circuit 101 implements the selected rule by accessing transform function algorithms from block 106 in FIG. 1. The transform function algorithms transform the series of uniformly distributed pseudo-random numbers from random number circuit 104 by 1) transforming them into a non-uniform distribution, 2) using a given set of the uniformly distributed pseudo-random numbers to performing set selection permutations or 3) both.

In this manner, the basic functions of pseudo-random number generation, pseudo-random number transformation, and association of rules with player or player events are standardized and entirely contained in gaming engine 100. System operator interface 109 is used by the casino or game developer to communicate with uniform random number circuit 104 and main control circuit 101. This communication is desirable to initialize, program, and maintain main control circuit 101 and public interface registry 107, for example. System operator interface also enables an operator to initialize, monitor and change seed values and key values used by uniform random number circuit 104. Any convenient hardware may be used to implement system operator interface 109 including DIP switches, a smart terminal, personal computer, or a dedicated interface circuit.

To implement a game, a game programmer develops a series of rules for the game. The series of rules are stored as a volume in rules library 108. The game programmer will then register the new game in public interface registry 107 by storing the location of the volume of rules in an appropriate address in public interface registry 107. The game programmer does not need to program or develop the random number circuit or transform algorithms to implement a new game. Further, the player using player interface unit 102 can access any of the games stored in rules library 108. To certify a new game, a game regulatory authority need only review the rules in the rules library 108 to verify that they follow the established rules for a particular game. This verification can be easily done by reviewing high-level language code such as FORTRAN, C, or Basic.

While the present invention is described in terms of the preferred implementation of casino games it should be understood that any game which has a random component and progresses by following predefined rules can be implemented in gaming engine 100. Player interface unit 102 may be entirely electronic or combine electronic and mechanical components. Player interface unit may supply any amount and kind of information in addition to the basic functions set forth above to main control circuit 101. Player interface unit 102 may be located in the same physical machine as the remaining portions of gaming engine 100 or may be located at a great distance from gaming engine 100. These and other alternatives will be discussed in greater detail hereinafter.

2. Random Number Circuit

Figure 2:
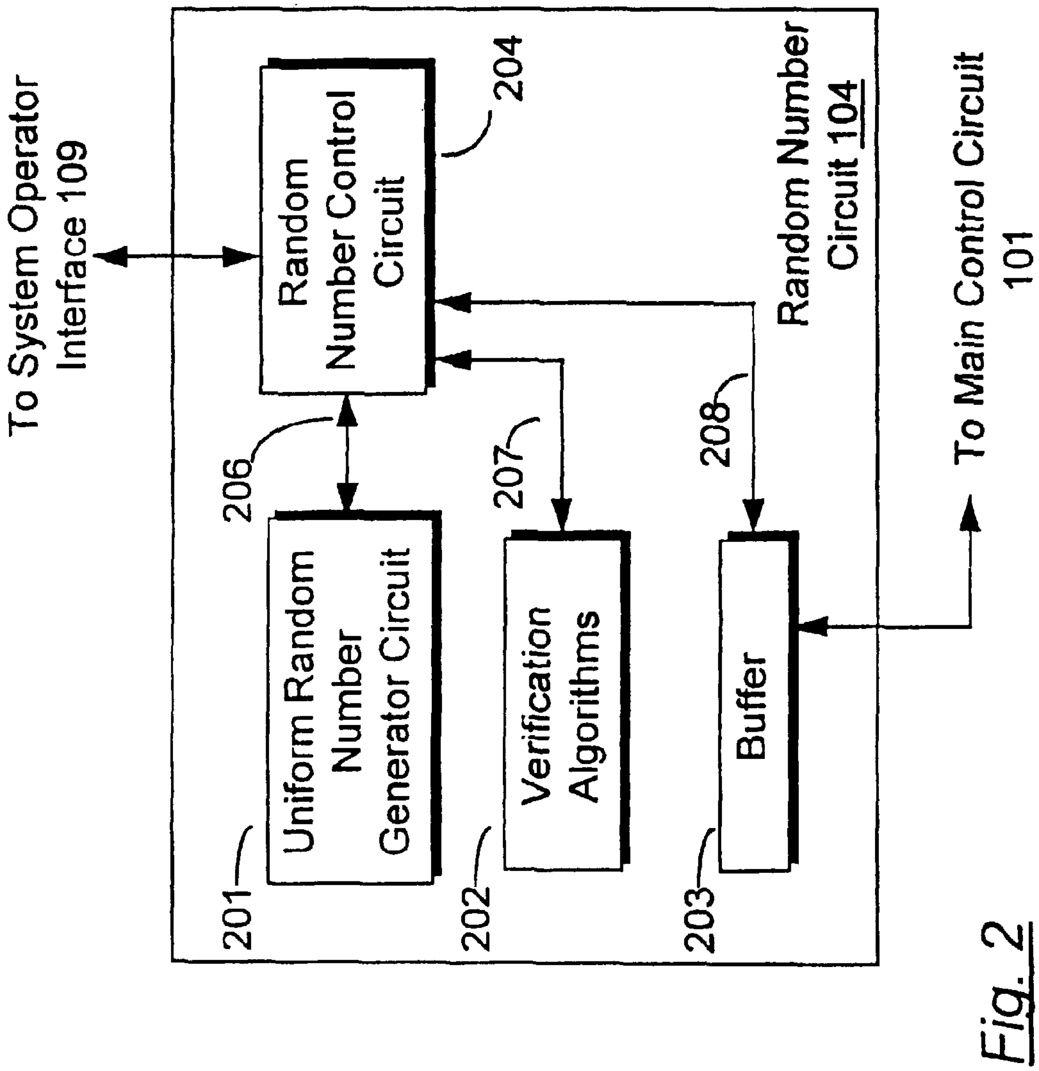
FIG. 2 illustrates a block diagram of the pseudo-random number subsystem in accordance with the present invention.

A preferred random number circuit 104 is shown in FIG. 2. Random number circuit 104 preferably includes random number generator circuit 201, verification algorithms 202, and buffer 203. Random number circuit 104 is controlled by random number control circuit 204 which is a microprocessor, microcontroller, or dedicated logic control circuit.

Random number generator circuit 201 provides a stream of uniformly distributed pseudo-random numbers on output 206. Alternatively, random number generator circuit 201 can provide parallel outputs on output 206. Also, more than one random number generator circuit 201 may be employed depending on the quantity of pseudo-random numbers demanded by the system.

Random number generator circuit 201 preferably supplies uniformly distributed pseudo-random numbers because a set of uniformly distributed numbers can be transformed easily by transform algorithms 106 into non-uniform distributions and combinatorial subsets. A preferred circuit for implementing random number generator circuit 201 is an ANSI X9.17 pseudo random number generator based upon a plurality of data encryption standard (DES) encryption circuits. Alternatively, random number generator circuit 201 may be implemented using the international data encryption algorithm (IDEA) encryption. Other random number generator circuits are known. When implementing other random number generator circuits 201, however, it should be appreciated that a high-quality, cryptographically strong pseudo-random number generator is preferable. A major advantage of the present invention is that the random number circuit 104 need be implemented only once to serve a plurality of games making it cost efficient to use relatively expensive circuitry to provide a high quality random numbered circuit 104.

Random number generator circuit 201 accepts as input one or more key values which are typically binary values having a fixed relatively large number of bits. For example, the ANSI X9.17 pseudo-random number generator uses 56-bit keys. Random generator circuit 201 also usually accepts a seed value, which is also another large bit binary value. Further, random number generator circuit 201 has a data input or clock input that accepts a continuously variable signal which is conveniently a clock representing date and time. In this manner, each time the signal on the clock or data input changes a new random number is output on line 206. Random number control circuit stores and provides the key values, seed value, and clock values to random number generator circuit 201.

A desirable feature in accordance with the present invention is that random number circuit 104 be able to boot up after a power fault (i.e., power is removed from the sytsem) using the same seed values, key values, and clock value that existed before the power fault. This feature prevents a player or operator from continually resetting the system or gaining any advantage by removing power from gaming engine 100. One way of providing this functionality is to buffer the key values, seed values, and clock values in memory within random number control circuit 204 before they are provided to random number generator 201. After a power on default, circuit 104 can reboot autonomously using the values stored in buffers. Alternatively, new values can be provided via system operator interface 109 to ensure that the output after a power fault is in no way predictable based upon knowledge of output after a prior power fault.

In a preferred embodiment, random number generator circuit operates continuously to provide the series of random numbers on line 206 at the highest speed possible. By continuously, it is meant that random number generator circuit 201 operates at a rate that is not determined by the demand for random numbers by the rest of the system. Random number control circuit 204 provides key values, seed values, and data values to random number generator circuit 201 independently of any processing demands on main control circuit 101 (shown in FIG. 1). This arrangement ensures that random number circuit 104 operates at a high degree of efficiency and is not slowed down by computational demands placed on main control circuit 101. In other words, the control circuit resources that implement random number control circuit 204 are independent of and usually implemented in a separate circuit from main control circuit 101.

Random number control circuit 204 accesses one or more verification algorithms 202 via connection 207. Verification algorithms 202 serve to verify that the raw random numbers on line 206 are statistically random to a predetermined level of certainty. Preferably, verification algorithms 202 include algorithms for testing independence, one-dimensional uniformity, and multi-dimensional uniformity. Algorithms for accomplishing these tests are well known. For example, independence of the pseudo random numbers can be performed by a Runs test. Uniformity can be verified by the Kolmorgorov-Smirnov or K-S test. Alternatively, a Chi-square test verify uniformity. A serial test is an extension of the Chi-square test that can check multi-dimensional uniformity.

Random number control circuit 204 preferably receives and stores a set of raw random numbers from random number generator circuit 201. The set of raw random numbers can be of any size, for example 1000 numbers. Random number control circuit 204 then implements the verification algorithms either serially or in parallel to test independence and uniformity as described hereinbefore. It may be advantageous to use more than one physical circuit to implement random number control circuit 204 so that the verification algorithms may be executed in parallel on a given set of raw random numbers.

If a set of raw random numbers do not pass one of the verification tests the numbers are discarded or overwritten in memory so that they cannot be used by gaming engine 100. Only after a batch of numbers passes the battery of verification tests, are they passes via line 208 to verify random number buffer 203. Buffer 203 is preferably implemented as a first-in, first-out (FIFO) shift register of arbitrary size. For example, buffer 203 may hold several thousand or several million random numbers.

By integrating verification algorithms 202 in a random number circuit 104, gaming engine 100 in accordance with the present invention ensures that all of the pseudo-random numbers in buffer 203 are in fact statistically random. This overcomes a common problem in pseudo-random number circuits wherein the random numbers are long-term random, but experience short-term runs or trends. These short-term trends make prediction of both the player and casino odds difficult and may create an illusion of unfairness when none in fact exists. The verification algorithms 202 in accordance with the present invention largely eliminate these short-term trending problems and create a pool of random numbers in buffer 203 that are both statistically random and will appear to be random in the short run time period in which both the casino and players operate.

Buffer 203 makes the random numbers available continuously to main control circuit 101. Main control circuit 101 may access any quantity of the numbers in buffer 203 at a time. Buffer 203 also serves to provide a large quantity of random numbers at a rate higher than the peak generation rate of random number generator circuit 201. Although it is preferable that random number generator circuit 201 and verification algorithms 202 are processed so as to provide random numbers to buffer 203 at a higher rate than required by gaming engine 100, short-term bursts of random numbers can be provided by buffer 203 at a higher rate.

3. Transform Function Algorithms

Figure 3:
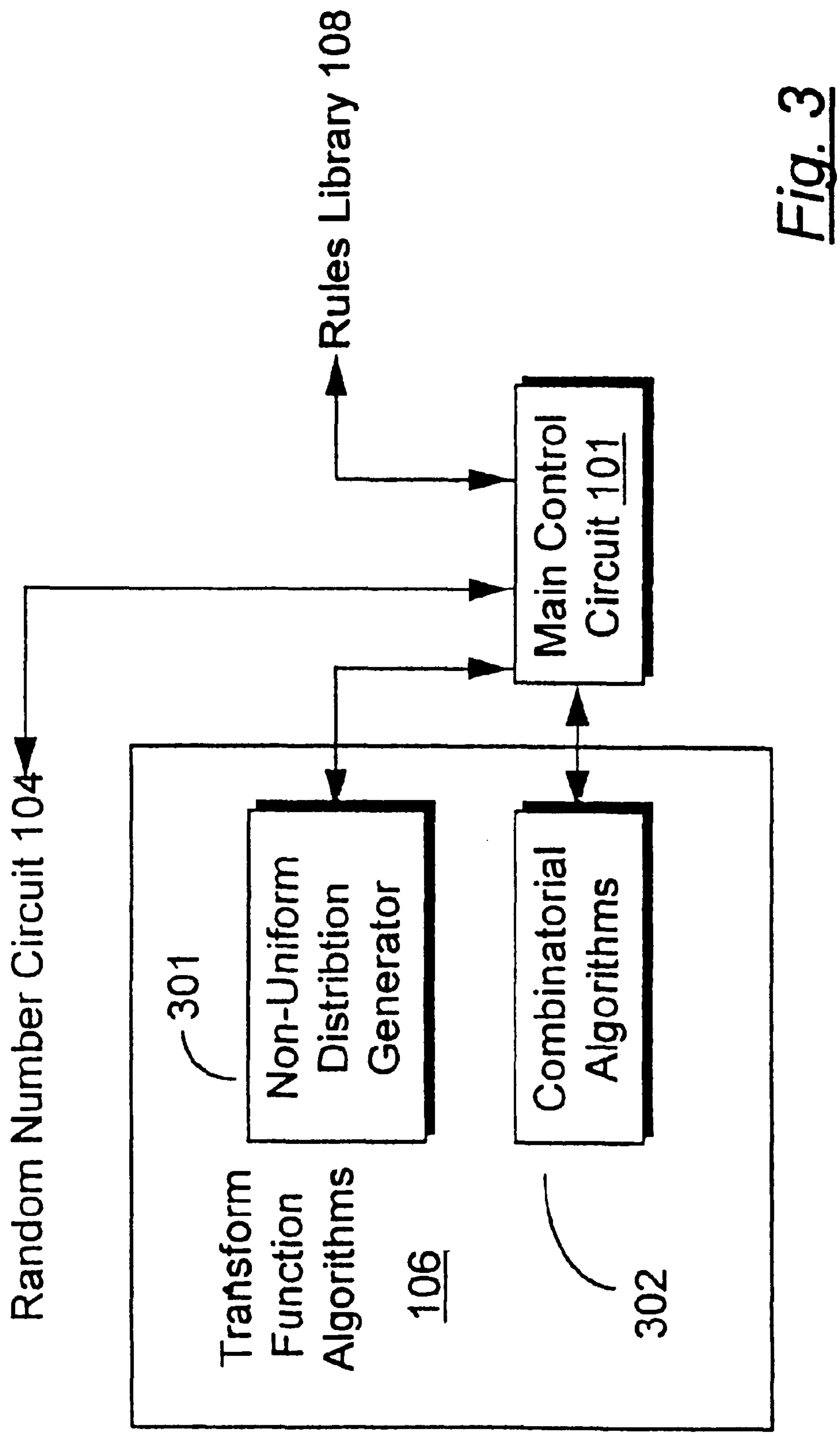
FIG. 3 illustrates the non-uniform distribution generator and combinatorial algorithm subsystems in accordance with the present invention.

Transform function algorithms 106 are accessed by main control circuit 101 as illustrated in FIG. 3. Examples of transform function algorithms 106 are a non-uniform distribution generator 301 and combinatorial algorithms 302. To execute some rules obtained from rules library 108, main control circuit 101 may be required to select one or more random values from a non-uniform distribution. Examples of non-uniform distributions are normal distribution, exponential distribution, gamma distribution, as well as geometric and hypergeometric distributions. All of these non-uniform distributions can be generated from the uniform distribution provided by random number circuit 104.

Rule implementations primarily require that main control circuit 101 access a series of pseudo-random numbers in the context of random set selection and permutations. This subset selection is performed by combinatorial algorithms 302. The combinatorial algorithms 302 operate on either the uniform number distribution provided directly by random number circuit 104 or the non-uniform distribution provided by non-uniform distribution generator 301. In this manner, a game of keno can be implemented by selecting a random 20 from a group of 80.

Another function of the transform algorithms 106 is to scale and center the series of random numbers. For example, a deck of cards includes 52 cards so that the set of random numbers must be scaled to range from 1 to 52. These and similar transform functions are well known.

An advantageous feature of the present invention is that these transform functions can be implemented a single time in a single piece of software or hardware and selectively accessed by any of the games in rules library 108. This allows a great variety of transform functions to be provided in a cost efficient and computationally efficient manner. The game designer need only provide rules in rules library 108 that access appropriate transform function algorithms 106 and need not be concerned with the details of how the transform function algorithms 106 are implemented. Similarly, a gaming regulatory authority can verify the correctness and fairness of transform algorithms a single time by providing extensive testing. Once the transform functions are verified, they need not be verified again for each game that is implemented in rules library 108. This independence between the rules programming and the non-deterministic programming result in highly standardized and reliable games while allowing the games designer greater flexibility to design a game in the rules library 108.

4. Main Control Circuit

Figure 4:
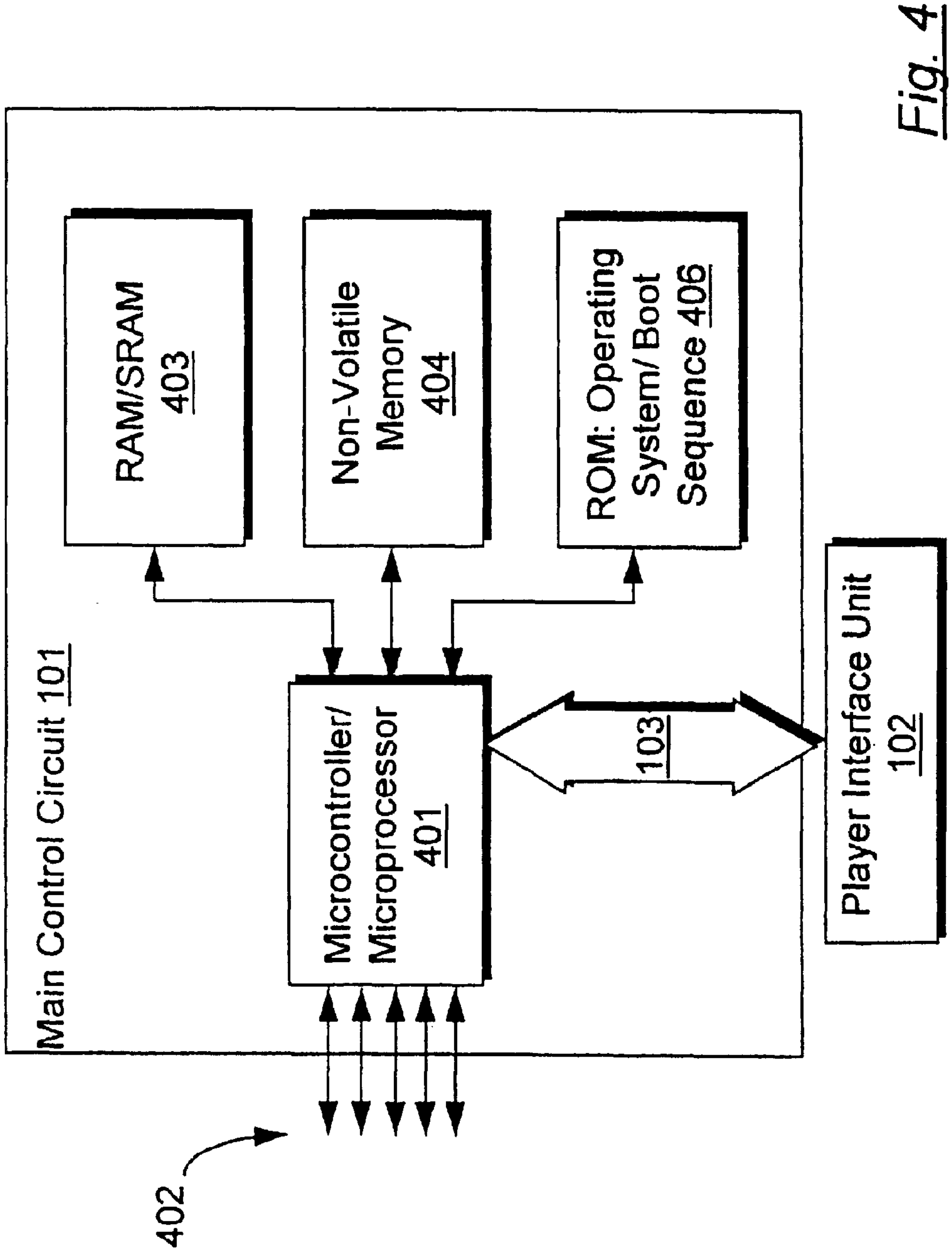
FIG. 4 illustrates a main control circuit in accordance with the present invention.

A preferred embodiment of main control circuit 101 is shown in block diagram form in FIG. 4. Preferably, a micro-controller microprocessor 401 is provided to perform calculations, memory transactions, and data processing. Microprocessor 401 is coupled through bus 103 to player interface unit 102. Microprocessor 401 is also coupled to player number circuit 104, transform function algorithms 106, public interface registry 107, and rules library 108 through bidirectional communication lines 402.

In a typical configuration, main control circuit 101 will have a quantity of RAM/SRAM 403, a quantity of non-volatile memory 404, and ROM for storing an operating system and boot sequence. ROM 406 operates in a conventional manner and will not be described in greater detail hereinafter. Non-volatile memory 404 is an addressable, preferably random access memory used to store information that is desirably saved even if power is removed from main control circuit 101. For example, microprocessor 401 may calculate statistics regarding the type of games played, the rate of game play, the rate of number request, or information about the player from player interface unit 102. The statistics are preferably stored in a non-volatile memory 404 to maintain integrity of the information. Similarly, non-volatile memory 404 may be used to maintain the state of a game in progress on player interface unit 102 so that is power is removed, universal gaming engine 100 can restore player interface unit 102 to the state at which it existed prior to the power outage. This may be important in a casino operation where the casino could incur liability for stopping a game when the player believes a payoff is imminent.

RAM 403 serves as operating memory for temporary storage of rules access from rules library 108 or for storing the operating system for quick access. RAM 403 may also store groups of random numbers while they are being processed by the transform function algorithms as well as address data provided to and accepted from the public interface registry.

It should be understood that main control circuit 101 may be implemented in a variety of fashions using conventional circuitry. While some memory will almost surely be required, the memory may be implemented as RAM, SRAM, EPROM or EEPROM to meet the needs of a particular application. Similarly, the components of main control circuit 101 shown in FIG. 4 may be implemented as a single circuit or single integrated circuit or in multiple circuits or integrated circuits. Additional features may be added to implement additional functions in a conventional manner.

5. Rules Library

Figure 5:
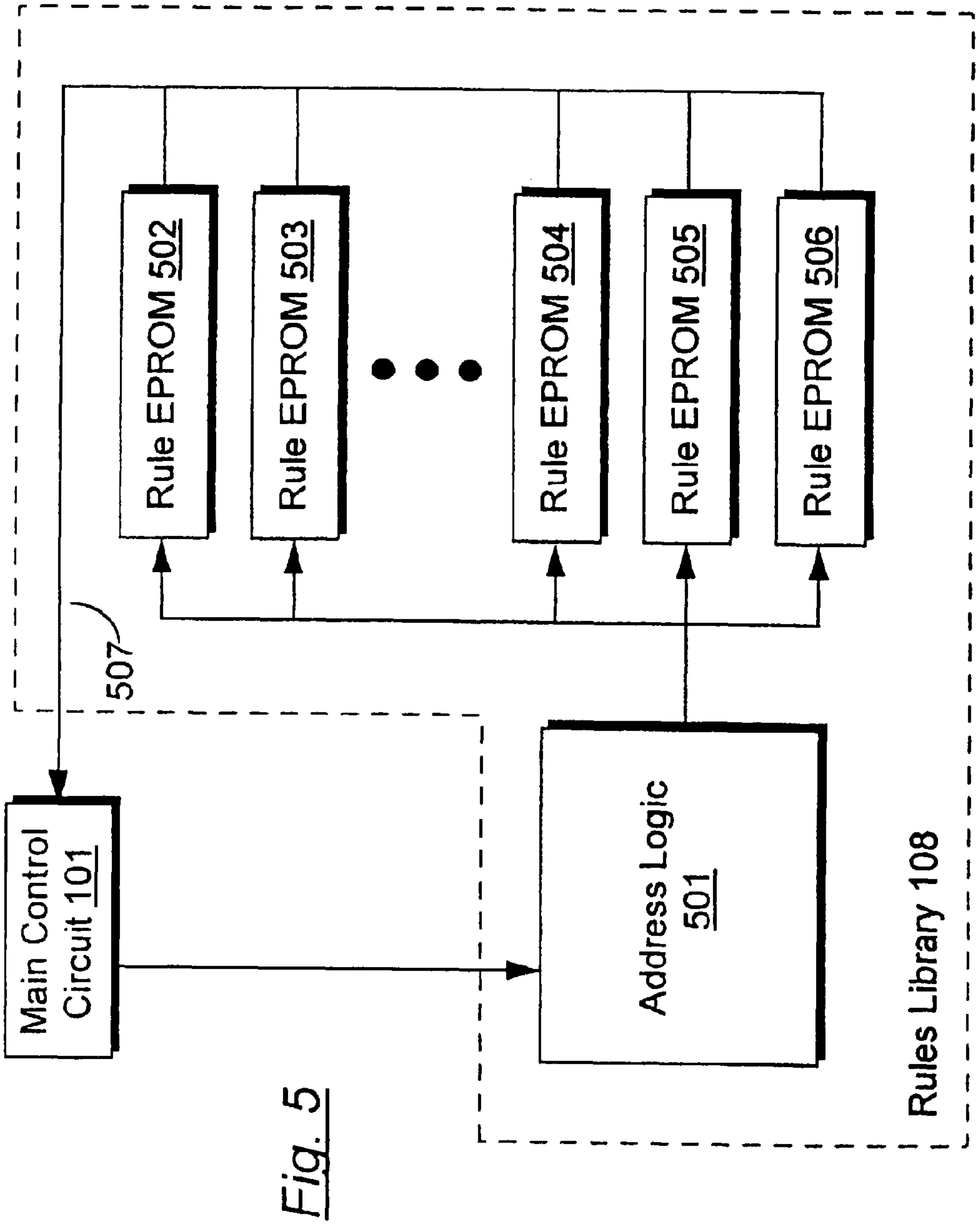
FIG. 5 illustrates in block diagram form implementation of the rules library in accordance with the present invention.

An exemplary embodiment of rules library 108 is illustrated in block diagram form in FIG. 5. Rules library 108 is preferably implemented as a plurality of volumes of rules where each volume is fixed in a rule EPROM 502-506. Any number of rule EPROM's can be supplied in rule library 108. Also, rule EPROM's 502 can be of various sizes. Rule EPROM's 502-506 may be replaced with equivalent memory circuits such as RAM, SRAM, or ROM. It is desirable from a gaming regulatory authority standpoint that rule EPROM's 502-506 cannot be altered once programmed so that the rules cannot be changed from the designed rules. This allows the gaming regulatory authority to verify the EPROM rules.

Address logic 501 provides address signals to select one of rule EPROM's 502-506. Additionally, address logic 501 serves to position a pointer to a specific rule within each rule EPROM 502-506. As set out herein before, which of rule EPROM's 502-506 is selected as determined by the current game being played as indicated by player interface unit 102 (shown in FIG. 1). The location of the pointer within a rule EPROM is addressed based upon the current state of the game and the particular user initiated event indicated by player interface unit 102. The information is conveyed from the user interface unit 102 in a player record that is mapped to rule library 108 by the information in public interface registry 107.

In practice, a game developer will program a series of rules that dictate the progression of a game in response to user or player initiated events. The rules will also dictate when random numbers are accessed and the type of random numbers which should be accessed (i.e., uniform or non-uniform distributions). Rules will also control payoffs, and place boundaries on the types of player events which will be accepted. The game developer will then burn these rules, once complete, into a rule EPROM, such as rule EPROM's 502-506. The rule EPROM can then be verified by a gaming regulatory authority, and once approved, be distributed to owners of gaming engines wishing to implement the newly developed game. In order to install the new game, the rule EPROM is installed in rules library 108 and registered in public interface registry 107. The registration process described hereinbefore provides gaming engine 100 the address information necessary to enable address logic 501 to access a particular rule in rules library 108 and provide that rule on output line 507 to main control circuit 101.

Although rules library 108 has been described in terms of a plurality of EPROM's 502-506 wherein each EPROM holds one volume of rules pertaining to a particular game, it should be apparent that many other configurations for rules library 108 are possible. Rules can be implemented in a single large memory or in a serial memory such as a tape or disk. Address logic 500 may be integrated in rules library 108, or may be integrated with main control circuit 101. Each game may be implemented in a single EPROM or may require several EPROM's depending on the particular needs of an application.

6. Method of Operation

Figure 6:
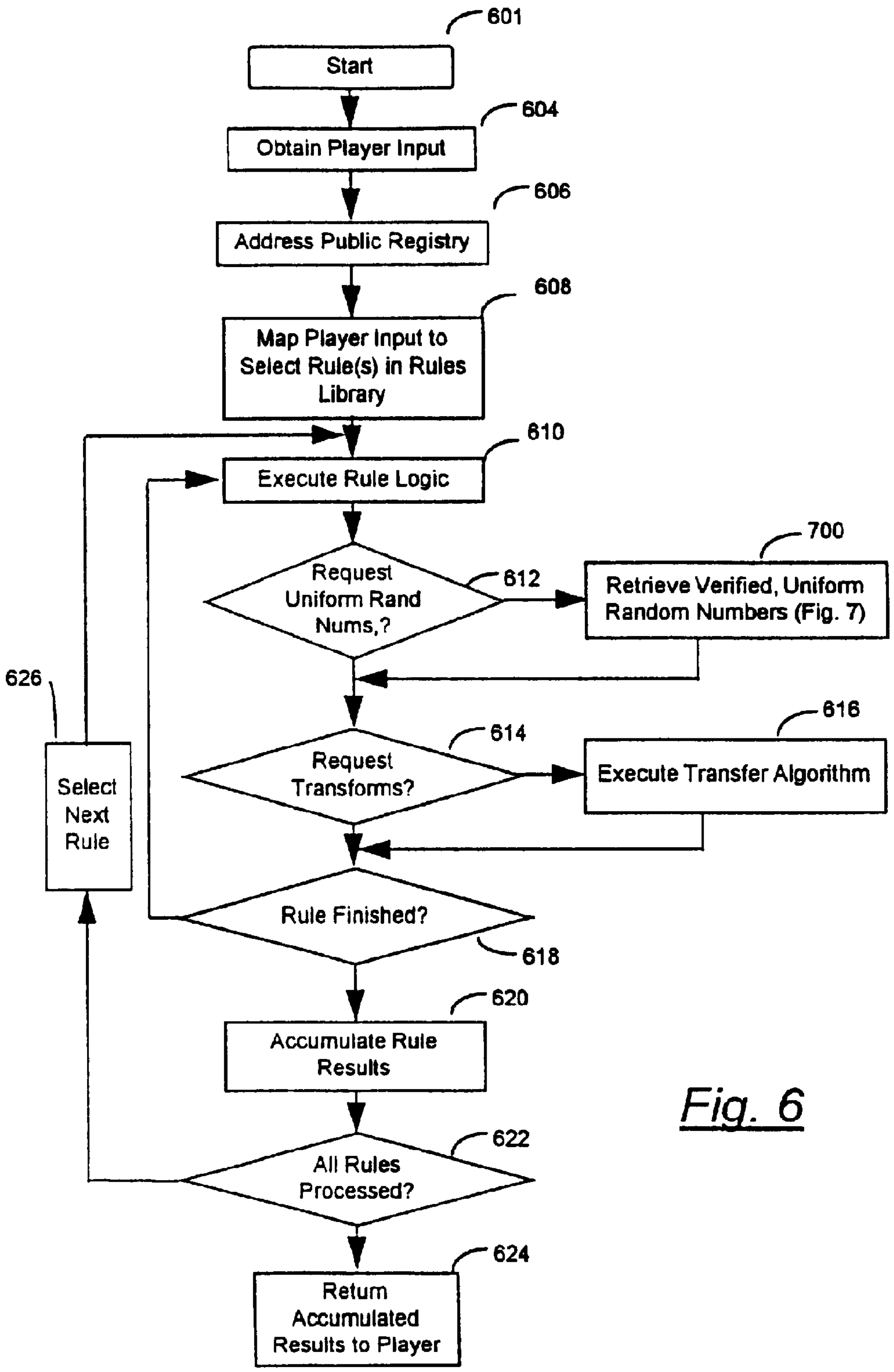
FIG. 6 illustrates a flow chart of a game implementation using the apparatus shown in FIG. 1.
Figure 7:
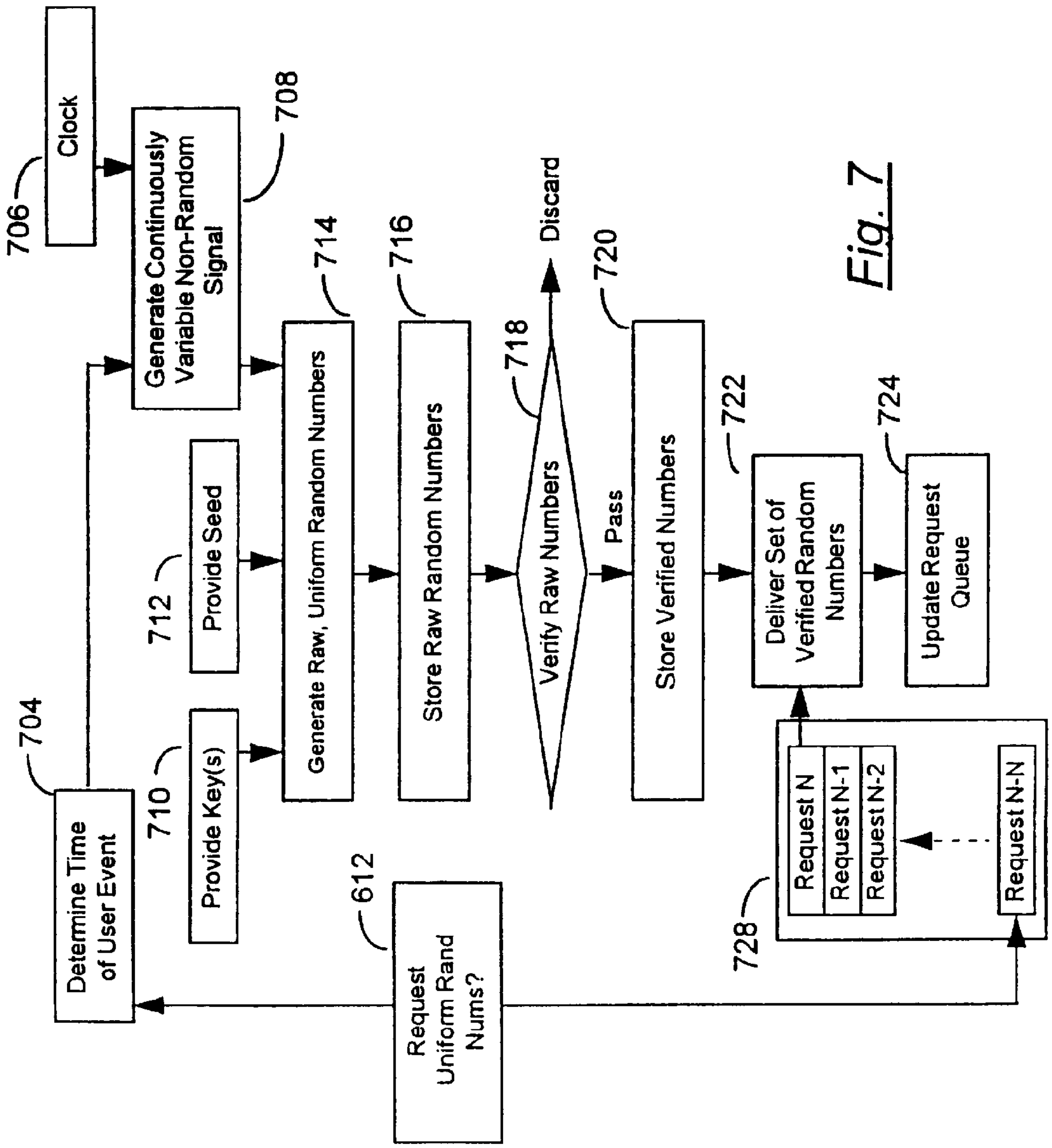
FIG. 7 illustrates a flow diagram for a second embodiment pseudo-random number distribution system.

FIG. 6 and FIG. 7 together illustrate in flow chart form a preferred method of operation of gaming engine 100 in accordance with the present invention. FIG. 6 details operation of a first embodiment single player gaming engine 100. When gaming engine 100 is started as indicated at 601 in FIG. 6, main control circuit 101 is initialized and goes through a boot-up sequence to bring it to an initial state. In this initial state it waits for user input at step 604. The player input or player record preferably indicates the game that is being played, the state of that game, and user initiated events and data that must be processed. Upon receipt of the player record, the public registry is addressed in step 606. The public registry returns a mapping record that matches the user record with a particular rule in the rules library in step 608.

One or more rules are accessed in step 608. Each of the one or more rules are processed in serial fashion in the embodiment illustrated in FIG. 6. One rule is processed in each pass through steps 610-622. A logical component of a first rule is processed in step 610, where the logical component includes processes of memory manipulations, calculations, and the like. In step 612, it is determined if the particular rule that was executed in step 610 requires pseudo-random numbers to process. If pseudo-random numbers are required, they are retrieved in step 700 which is illustrated in greater detail in reference to FIG. 7.

It is determined if the rule requires any transform algorithm in step 614. If a transform algorithm is required it is obtained in step 616. It should be understood that the transform algorithm may be permanently resident in the main control circuit 101 and so the step of obtaining 616 may be trivial. Once the necessary transform algorithm is obtained, it is determined if the rule is completely processed in step 618. If not, flow returns to step 610 and the rule logic is executed until the rule is completely processed and a final result of the rule is determined. Once the rule is finished, control moves from step 618 to result accumulation step 620.

Each rule accessed in step 608 is processed in a similar manner by sequentially selecting each rule in step 626 until it is determined that all rules have been processed in step 622. Once all the rules are processed, the accumulated results are returned to the player in step 624. The results are of the rule are determined in steps 610, 612, and 614 by performing any transforms required on the random numbers, executing any deterministic components using conventional calculations and memory transactions.

7. Method for Random Number Generation

FIG. 7 illustrates a flow chart showing steps in filling random number request step 700 in FIG. 6. The process shown in FIG. 7 is initiated when request 614 is made. More accurately, many of the sub-processes shown in FIG. 7 are ongoing, but the processes for generating and supplying random numbers are also responsive to the request for random numbers 700.

Continuously ongoing processes include clock generation step 706, providing key value(s) step 710, and providing seed value(s) step 712. The clock signal generated in step 706 need not be a real time clock, nor does it have to provide a linearly increasing or decreasing output. It is sufficient that clock 706 output a continuously variable signal at a regular interval. As set out herein before, clock generation is preferably performed by random number control circuit 204 shown in FIG. 2.

In a preferred embodiment, a signal is generated by the occurrence of the player event. For example, the time of the player event is determined at step 704 and may be used as shown in FIG. 7. At step 708, the clock signal and the player event signal are combined to provide a continuously variable non-random signal. Where both the player event signal and the clock are digital, the combination can be realized as logical function such as AND, OR, XOR, NAND or the like. Also, the combination may be a concatenation or subtraction function. This feature of the present invention is optional, but adds a new degree of randomness.

At step 714, a series of raw random numbers is generated using the continuously provided key values, seed values, and variable signal. The raw random numbers are stored at step 716 to build a group large enough to be verified during step 718. Groups of raw random numbers that fail verification step 718 are discarded, while those that pass are stored at step 720 in buffer 203 shown in FIG. 2.

In accordance with a first embodiment, the verified random numbers are delivered in step 722, returning process flow to step 618 shown in FIG. 6. In an alternative embodiment shown in FIG. 7, request 614 is queued at step 728 using RAM 403 shown in FIG. 4. Request queuing 728 is implemented as a first in first out or "push up" register having N queue capacity. In one embodiment, N is between 2 and 10. Queuing step 728 stores each request and processes each request in turn. In this embodiment, delivery step 722 serves whatever request is provided during step 728. Once a request is delivered, the request queue is updated in step 724.

Although the request queue is optional, it increases efficiency of random number generation step 700. This is especially important in the networked multi-user embodiment shown in FIG. 8. FIG. 9 illustrates generally a relationship between server speed, queue size, and the average number of customers, or requests for pseudo-random numbers, are waiting in the system. FIG. 9 is derived by modeling gaming engine 800 (shown in FIG. 8) as an M/M/1 queue to produce parameters for expected wait times in the system. FIG. 9 assumes that requests for pseudo-random numbers are made according to a Poisson process. This means that the times between successive arrivals are independent exponential random variables.

Upon arrival, a customer either immediately goes into service if the server is free, or joins queue 728 if the server is busy. When step 722 finishes obtaining the requested subset, the request is returned to the game and leaves the system. The next request, if any, is serviced. The times required to form the requested random subsets are assumed to be independent exponential random variables also. With these assumptions, request queue 728 can be viewed as an M/M/1 queue. The first two M's indicate that both the interarrival times as well as the service times for requests are exponential random variables. The "1" indicates there is just one server.

Server speed is largely determined by the hardware chosen to implement the present invention, and can be easily varied by those of skill in the art to meet the needs of a particular application. As is apparent in FIG. 9, higher server speeds result in fewer waiting customers. From the lower portion of FIG. 9, is apparent that if the queue size is reduced to zero (i.e., no request queue), the average wait time climbs even with very fast servers. Hence, to minimize wait time, a request queue is desirable.

It should be understood that the process steps shown in FIG. 7 may be carried out in any convenient order unless expressly specified above. Process steps may be carried out in serial or parallel depending on the particular capabilities of main control circuit 101 shown in FIG. 1. For example, where control circuit 101 is multi-tasking or capable of parallel processing, several process steps may be executed at once. Also, process steps may be added to those shown in FIG. 7 to implement additional functions without departing from the inventive features of the present invention.

8. Network Embodiment

Figure 8:
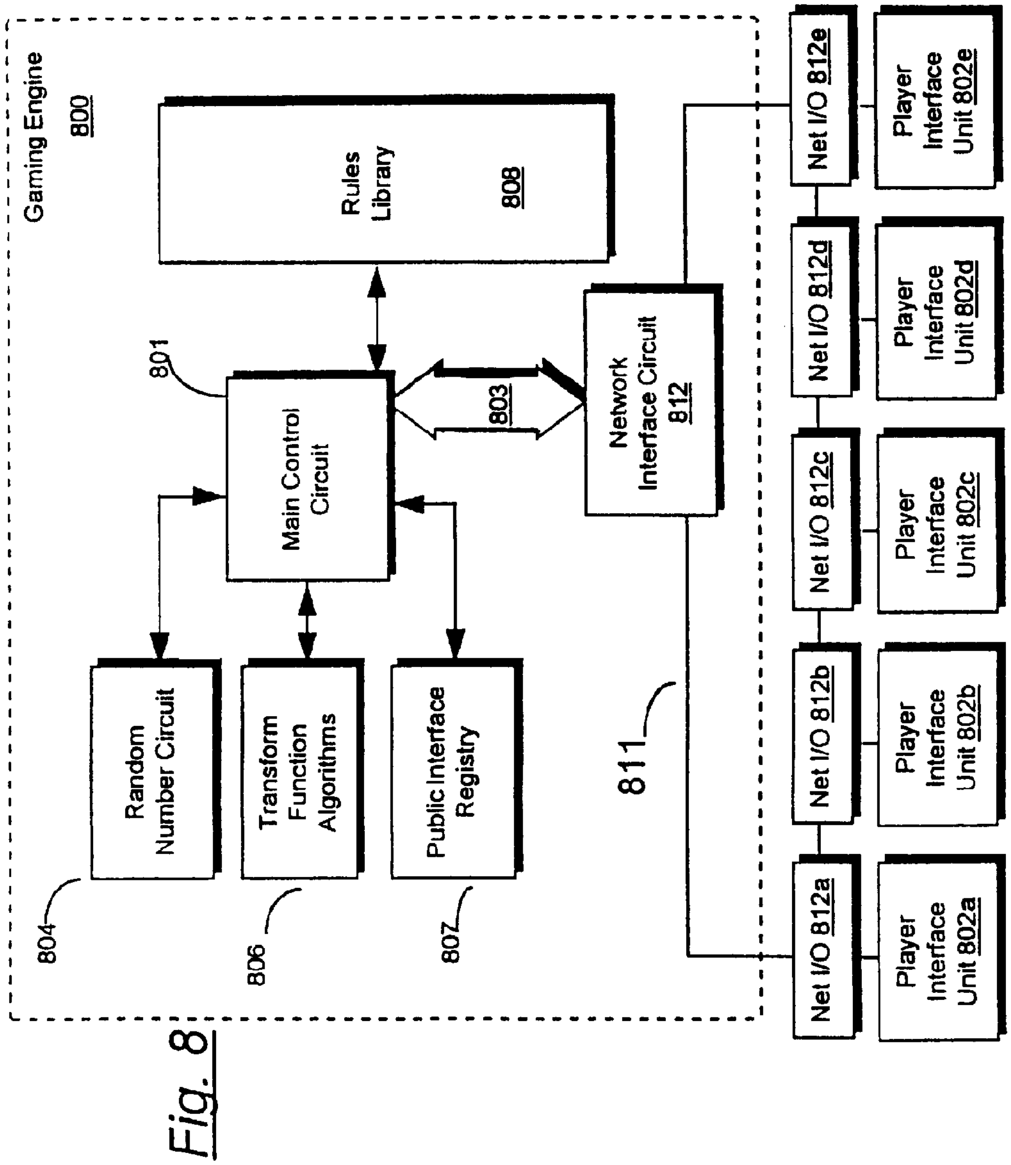
FIG. 8 illustrates a multiple player networked implementation in accordance with the present invention.
Figure 9:
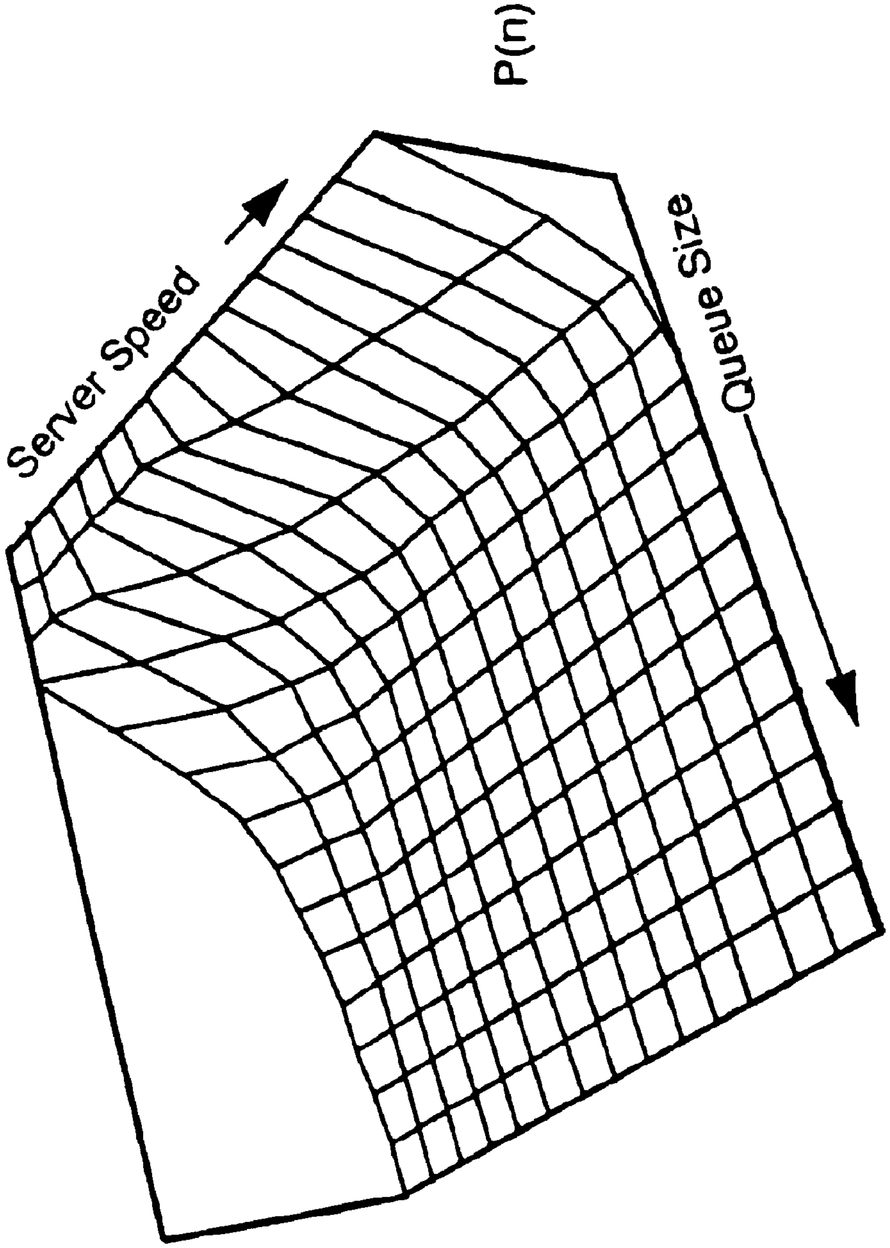
FIG. 9 illustrates in graphical form relationships between server speed, queue size, and customer wait times of an apparatus in accordance with the present invention.

FIG. 8 illustrates in block diagram for a network embodiment in accordance with the present invention. Basic components of gaming engine 800 are similar to gaming engine 100 including random number circuit 804, transform algorithms 806, public interface registry 807, and rules library 808. Main control circuit 801 includes all of the functions described herein before in reference to main control circuit 101 but also includes function for supporting network interface circuit 812. Data bus 812 couples main control circuit 801 to network interface circuit 812.

The network embodiment shown in FIG. 8 serves a plurality of player interface units 802*a*-801*e*. This additional functionality is provided in part by network interface circuit 812 and network I/O circuits 812*a*-812*e*. Network interface circuit 812 and network I/O circuits 812*a*-812*e* can be conventional network circuits used for 10baseT, ethernet, Appletalk, or other known computer network systems. In selecting the network circuits, it is important that the data throughput is adequate to meet the needs of a particular system.

Network interface circuit 812 communicates a plurality of player records of information to main control circuit 801. Main control circuit may be a conventional processing circuit that serially processes each of the player records in a manner similar to main control circuit 101. Preferably, main control circuit 801 includes multitasking or parallel processing capabilities allowing it to process the plurality of player records simultaneously.

Simultaneous processing requires that main control circuit 801 access a plurality of rules from rules library 808, each of which may require main control unit 801 to request a set of pseudo-random numbers from random number circuit 804. In a preferred embodiment, the multiple requests for pseudo-random numbers are stored in a request queue implemented in memory of main control circuit 801. The request queue is preferably able to store more than one request. A suitable request queue can store ten requests. Random number circuit 804 treats each request from the request queue of main control circuit 801 in a manner similar to the requests from main control circuit 101 described herein before. The combination of the request queue with the buffer of random number circuit 804 allows gaming engine 800 to service requests corresponding to player initiated events very efficiently. A request queue holding even two or three requests can reduce the probability of any player waiting for delivery of a set of pseudo-random numbers significantly.

The request queue can be implemented by configuring a portion of the RAM available to main control circuit 801 as a first-in first-out register or push up stack. Each request for a set of random numbers is initially placed at the bottom of the request queue and sequentially raised in the request queue until the request is filled. This operation is described herein before with respect to FIG. 7.

By now it should be appreciated that an apparatus, method, and system for gaming is provided with greatly improved efficiency and quality over existing gaming methods and systems. The universal gaming engine in accordance with the present invention is a gaming apparatus providing a consistent game development platform satisfying the needs of gaming authorities, house, player, and game developer. The gaming engine in accordance with the present invention separates the problems of developing game rules from the difficulty of producing chance events to support those rules. By including basic functions shared by a number of games, hardware costs are greatly reduced as new games can be implemented merely by providing a new set of rules in the rules library and the basic hardware operating the game remains unchanged. It is to be expressly understood that the claimed invention is not to be limited to the description of the preferred embodiments but encompasses other modifications and alterations within the scope and spirit of the inventive concept.

Generating Truly Random Numbers

In various embodiments, random number circuit 104 may generate one or more random numbers which are not the output of a deterministic computer program. Random numbers may include numbers that cannot be accurately predicted using deterministic algorithms. Such random numbers may be derived, for example, based on physical phenomena. Radioactive particles may decay at unpredictable times. Random numbers may thereby be derived from the times at which radioactive particles do decay. Random numbers may be based on measurements of atmospheric noise. For example, the amplitude of a signal detected at a radio antenna may be random and may reflect random atmospheric disturbances. The measured amplitude may be used as a random number, for example. The HotBits service at Fourmilab in Switzerland generates random numbers based on radioactive decay. RANDOM.ORG generates random numbers based on radio noise. Random numbers may also be generated based on noise in a resistor (e.g., Johnson noise) or a semi-conductor diode.

Non-Uniform Random Distributions

In various embodiments, random number circuit 104 may generate random numbers or pseudo-random numbers according to a non-uniform distribution. For example, random number circuit 104 may receive an electronic copy of the New York Times newspaper and select a particular letter character (e.g., “a”, “b”, “c”, “d”, etc.) using some random algorithm. The selected letter character may then be converted into a number (e.g., “a” becomes “1”, “b” becomes “2”, etc.). The number may be returned as the output of the circuit. It will be appreciated that in the English language, some letter characters may occur more frequently than others in common usage. For example, “e” may occur more often than “z”. Accordingly, the output of the random number circuit may include numbers from a non-uniform distribution.

In various embodiments, numbers that are generated according to a non-uniform distribution may be converted into numbers that are uniformly distributed. For example, suppose the output of random number circuit 104 is to be either a “0” or a “1”. The “0” is to be output with probability $\sqrt{(1/2)}$, and the “1” is to be output with probability $1-\sqrt{(1/2)}$. The unequal probabilities mean that the distribution is non-uniform. Further suppose that a given output of the random number circuit is statistically independent of the next output. To generate a “0” or “1” according to a uniform distribution, two outputs of the random number circuit may be sampled. The two outputs are mapped to a single output as follows: “00” maps to “0”; “01” maps to “1”; “10” maps to “1”; and “11” maps to 1. It will be appreciated the probability of the number 0 occurring is therefore: $\sqrt{(1/2)}*\sqrt{(1/2)}=1/2$, and that the probability of the number 1 occurring is also ½. Thus the final output follows a uniform distribution, and so a non-uniform distribution has been converted into a uniform distribution. As will be appreciated, in various embodiments, other mapping functions may be used to convert numbers generated according to a non-uniform distribution into numbers following a uniform distribution. Mapping functions may require one, two, three, or any quantity of numbers generated according to a non-uniform distribution to be mapped into numbers that follow a uniform distribution.

Numbers Which are Not Statistically Independent

In various embodiments, random number circuit 104 may generate numbers that are not statistically independent. In some embodiments, random number circuit 10 may include a counter that increments at random times. For example, the counter may count the number of radioactive decays detected from a radioactive sample. Thus, successive outputs of the counter may represent increasing values, as more and more radioactive decays will have been counted as time goes on. As will be appreciated, the outputs of the counter may be random numbers. However, the random numbers may not be statistically independent. For example, if a first output of the counter is 1019, it can be predicted that a second output of the counter that occurs after the first will be a number greater than 1019.

In various embodiments, a function, transform, or other process may be used to derive statistically independent random numbers from random numbers that are not statistically independent. For example, where a counter outputs successively increasing numbers, a new set of numbers may be derived as the difference between successive outputs of the counter. These differences may represent statistically independent random numbers. A process for deriving statistically independent random numbers from random numbers that are not statistically independent may be performed outside of the random number circuit 104, or using the random number circuit.

Games That are Solely Non-Deterministic

In various embodiments, a game may be conducted which has only non-deterministic components. For example, upon game initiation, random number circuit 104 may be triggered. The circuit may thereupon output a random number. The player of the game may then be credited with a number of credits equal to the random number.

Games that are Solely Deterministic

In various embodiments, a game may be conducted which has only deterministic components. For example, a physical ball may be dropped through a Rube Goldberg type contraption, or other complicated contraption. The ball may eventually fall into one of two slots, one of which will cause the player to be paid. The path and eventual destination of the ball may be deterministic, following the laws of physics. However, the device may be so complicated that it would be difficult for a person to figure out the destination of the ball. Thus, the outcome of the game might still carry the element of surprise or unexpectedness for a human player. Further, the configuration of the contraption may be changed each game, so that the game does not always have the same outcome. The configuration of the contraption may itself be changed according to a preset or deterministic pattern.

Numbers are Not Independent, but Payouts Are

In various embodiments, random number circuit 104 may generate random numbers that are not independent. Nevertheless, the random numbers generated, when fed into game rules, may lead to independent payouts. For example, suppose a given number generated by random number circuit 104 is equal to the prior number generated plus an independent random integer which can take on values of 1, 2, 3, or 4, all with equal probability. The rules may determine a payout based on the modulo 4 value of the given random number generated by the random number circuit. It will be appreciated that, although the given random number and the prior random number are not independent, the modulo 4 values of such random numbers are. Thus, game payouts will be independent even though random numbers used to generate the game payouts were not independent.

Thus, in various embodiments, random numbers used to determine game payouts need not be independent, so long as game rules interact with the random numbers in such a way as to make the game payouts independent.

Wireless

In various embodiments, the main control circuit 101 may communicate with the player interface unit via wireless signals. Such wireless signals may include Bluetooth, Wi-Fi, cellular standards (e.g., GSM, PCS, CDMA), or any other wireless technologies. Further, the main control circuit may communicate with the player interface unit 102 via one or more intermediary devices. For example, the main control circuit may transmit a wireless signal to a cellular phone tower. The tower may in turn retransmit the signal to the player interface unit. Similarly, the player interface unit may transmit a wireless signal to the cellular tower. The cellular tower may, in turn, retransmit the signal back to the main control circuit.

Player Interface is a Wireless Device

In various embodiments the player interface unit 102 may include a wireless device. The player interface may include a cellular phone, a personal digital assistant or personal data assistant (PDA), a laptop, a pager, a music player (e.g., an Apple iPod), or any other device capable of wireless communication. In various embodiments, the player interface may include a mobile gaming device.

Mobile Gaming Device

As used herein, the term "mobile gaming device" may refer to any device that is readily movable or portable and which allows for players to gamble on one or more of at least the following: (a) a game of chance; (b) a sporting contest; (c) a game of mixed chance and skill (e.g., blackjack); (d) a game of skill; (e) a slot machine game (e.g., a game of video slots); (f) a lottery game; (g) a game of cards (e.g., a game of poker); (h) a pull-tab game; (i) a game of bingo; (j) a natural event (e.g., the occurrence of a hurricane); (k) a political event (e.g., the winner of an election); (l) an event of popular culture (e.g., the date of a wedding between two celebrities); and so on. A mobile gaming device may be movable or portable in the sense that the average human would be able to transport the device without significant exertion and without the aid of heavy machinery. A mobile gaming device may be movable or portable in the sense that it is not, by design, locked, bolted, or tied down to the same location for extended periods of time (e.g., months). It is, however, contemplated that a mobile gaming device may be temporarily fixed into place (e.g., with locks or bolts) so that a human might physically interact with the device without risk that the device will be accidentally pushed, moved, toppled, etc. A mobile gaming device may include a processor for executing various programs, including programs for operating games, programs for communicating with other devices, programs for presenting advertisements, programs for presenting entertainment, and any other programs. A mobile gaming device may include memory for storing program data, for storing image data, for storing data about a player, for storing information about outcomes of games played on the mobile gaming device, for storing accounting data, and so on. A mobile gaming device may include various output devices. Such output devices may include a display screen, such as a liquid crystal display. The display screen may display images, videos, cartoons, animations, text, or any other feasible output. Output devices may include a speaker. The speaker may generate audio outputs. For example, the speaker may generate voice outputs, the sound of bells, the sound of engines, or any other sound. The speaker may generate vibrations. A mobile gaming device may include one or more input devices. The input devices may allow a player to interact with the mobile gaming device. The mobile gaming device may include buttons, keypads, roller balls, scrolling wheels, and so on. The mobile gaming device may include a touch screen which, e.g., can sense contact from a human's touch and/or from a stylus. The mobile gaming device may include a microphone for receiving audio inputs. The microphone may be used for receiving voice inputs. A mobile gaming device may include a card reader for receiving inputs from a magnetically striped card (e.g., from a credit card or player tracking card). A mobile gaming device may also include a smart card reader. A mobile gaming device may include a camera for capturing images or video. A mobile gaming device may include a biometric reader, such as a thumb-print reader or retinal scanner. A mobile gaming device may include a communications port. The communications port may include an antenna for broadcasting and/or for receiving electromagnetic signals, such as wireless signals. The communications port may include an optical communication mechanism, such as a laser or diode. The communications port may include an electric contact, which may interface to a wire, to a cable, or to the electronic contact of another device so as to create an electronic connection. The electronic connection may be used for purposes of communication and/or for the purposes of drawing power. A mobile gaming device may include a portion which is geometrically configured to fit into a docking area of another device. The other device may include a portion with a complementary geometrical configuration. When the mobile gaming device is docked into the other device, the mobile gaming device may communicate with such device and/or draw power from the device. For example, the mobile gaming device may upload game software from the other device or download information about player gambling activities to the other device. A mobile gaming device may include a power source, such as a battery or fuel cell. The mobile gaming device may further include a sensor for determining when power is low. The sensor may trigger an indicator, which may indicate an amount of power remaining. The mobile gaming device may include a radio frequency identification (RFID) tag. The tag may include a unique signature, and may allow other devices to recognize the presence of the mobile gaming device. For example, a sensor embedded in a door frame may detect a signal from an RFID tag embedded within a mobile gaming device and thereby recognize the presence of the mobile gaming device. In an example of its general operation, a mobile gaming device may receive an indication of a player identifier, such as from the swipe of a player tracking card through a magnetic card reader associated with the mobile gaming device. The mobile gaming device may wirelessly transmit the player identifier to a casino server. The casino server may transmit a confirmation signal back to the mobile gaming device, confirming that the player has adequate credits on account to engage in gambling activities. The mobile gaming device may receive a game initiation signal from a player, e.g., via one the buttons on the mobile gaming device. The mobile gaming device may then execute a game program to generate a random outcome, and present the random outcome to the player. For example, on its displays screen, the mobile gaming device may simulate the spinning of slot machine reels, which may be shown to stop with a particular outcome displayed centrally. The mobile gaming device may inform the casino server of the outcome of the game. The casino server may, accordingly, add or subtract credits from the player's account. It will be appreciated that there are many other ways in which a mobile gaming device may operate. A mobile gaming device may be a device such as a Blackberry®, iPod®, personal digital assistant, mobile phone, laptop computer, camera, personal computer, television, electronic book (eBook), and so on. A mobile gaming device may include a more general purpose device which is configured to allow gaming activity, e.g., through downloads of gaming related software to the device. A mobile gaming device may also include a special purpose device dedicated to gaming. A mobile gaming device may include a device as set forth in Nevada bill AB471.

Detection of One Device by Another

In various embodiments, such as when the gaming engine communicates with the player interface unit, two devices may communicate wirelessly. There may be a process by which one device detects another. Various embodiments described herein may refer to the interaction between a first device and a "nearby" second device. In various embodiments, the first device may take action if the second device is nearby. In various embodiments, the second device may take action if the first device is nearby. When terms such as "nearby", "near", "close", "proximate", "presence", or the like are used, it will be understood that the first device may recognize the presence of the second device in various ways, that the second device may recognize the presence of the first device in various ways, that the first device may react to the presence of the second device in various ways, and that the second device may react to the first device in various ways. It may be noted that the first device may react to the presence of the second device without recognizing the presence of the second device if, for example, the first device is instructed to take an action by a third device which recognizes that the second device is near to the first device. In various embodiments, the first device and/or the second device may be in motion. For example, the first device may be moving (e.g., the first device may be carried by a walking person) while the second device may be stationary.

Various technologies may allow a first device to recognize and/or to react to the presence of a second device. Various technologies may allow a second device to recognize and/or to react to the presence of a first device. As used herein, the term "beacon" may refer to a device which generates a signal which may be used as a reference signal by another device or person, e.g., so that the other device may determine its own location or position. A beacon may emit a continuous, periodic, sporadic, or other type of signal. A beacon may emit a directed signal (e.g., a signal which is most easily detected by devices at a certain incident angle to the beacon) or the beacon may emit a signal of equal strength in all directions. A beacon may emit a signal when triggered by the presence of another device, or may emit a signal independently of other events. A beacon may have, as its sole function, the broadcast of a reference signal. A beacon may serve as a beacon only incidentally. For example, a light bulb may incidentally serve as a beacon even though its primary purpose may be to light a room. A beacon may be natural (e.g., the sun) or man-made. A beacon may emit light, sound, radio waves, microwaves, odors, or any other form of signals.

Radio Frequency Identification (RFID) tags or transponders are devices, generally small, that can transmit signals and/or redirect signals, and use such signals as a means for providing identification. The transmitted or redirected signals are generally radio waves. Signals which are transmitted or redirected may contain a unique signature or pattern, which may serve to uniquely identify the RFID tag. If the tag is associated with a device (e.g., by attachment or by incorporation into the device), then the unique identification of the tag can, by association, serve to uniquely identify the device.

Near field communication (NFC) is a technology that allows for secure wireless communication over short distances, typically in the range of inches. An exemplary application has been tested by Motorola and Mastercard, in which cellular phones are outfitted with NFC to allow for credit card payments using cellular phones.

Bluetooth is a specification for wireless networks which provides a means for devices to use radio waves to communicate over short distances.

WiFi is a technology, based on radio waves, for operating wireless local area networks. WiFi can allow a device to access the Internet via hotspots. WiFi can also allow two devices to communicate with one another directly in peer-to-peer mode.

Infrared data transmission can be used as a means of communication between two nearby devices. For example, an infrared light-emitting diode (LED) can be used to generate signals. The signal pattern can be created by switching the LED on and off. A receiver may include a silicon photodiode, which may convert incident infrared light into electrical signals. Infrared signals may also be transmitted with lasers.

A device may be recognized by means of a captured picture or image of the device. For example, a first device may take a picture of a second device. The first device may use image processing algorithms to detect salient features of the second device. For example, if the second device has a pattern of black and white stripes, then the first device may search for such a pattern within captured images.

One or more devices may use positioning technologies to determine their own location. Once the locations of two devices are known, simple algorithms may be used to determine whether the devices are close to one another or not. For example, the distances between two devices with known x and y coordinates can be at least approximated using the Pythagorean Theorem. Various positioning technologies may be used. For example, a device may receive a signal from a beacon or other signal generator of a known location. Particularly if the beacon has a short range, the device's position may be assumed to approximate the position of the beacon. In various embodiments, a device may receive signals from multiple beacons or signal generators. The signal generators may coordinate to transmit the signals simultaneously. However, depending on the device's location, the device will not necessarily receive the signals from all the beacons at the same time. For example, if the device is closer to beacon 1 than to beacon 2, the device will receive the signal from beacon 1 prior to receiving the signal from beacon 2. Based on the arrival times of signals from the various beacons, the device's location may be deduced. For example, geometric or trigonometric algorithms may be used to determine the location of the device based on the known locations of the beacons and based on the arrival times of simultaneously transmitted signals from the beacons. In an analogous fashion to systems involving beacons, positioning systems may make use of receivers at known locations (e.g., fixed receivers). The fixed receivers each receive a signal from the device about which a location is desired. The same signal from the device might arrive at the different receivers at different times, or from different angles. Based on the arrival times or angles of arrival of the signal at the various receivers, algorithms may be used to determine the location of the device. Exemplary positioning systems are as follows:

The Global Positioning System (GPS) is based on a constellation of satellites which transmit reference signals to locations on earth. GPS receivers can pick up reference signals from multiple satellites and use the signals to determine a position and/or an altitude.

Long Range Navigation (LORAN) is a navigation based on earth-based radio transmitters. The location of a device can be estimated based on differences in arrival times at the device of signals from three or more transmitters.

Radiolocation using the cellular telephone network is a system whereby cellular base stations serve as fixed receivers. The signal from a cellular phone may be received at multiple base stations. The location of the cellular phone may be determined based on when a signal from the cellular phone was received at each of the base stations, based on the angle with which a signal from the cell phone was received at each of the base stations, and/or based on characteristic distortions in the cell phone signal that would indicate a particular location of origin of the signal.

A first device may emit an audio signal. The audio signal may consist of a distinct series of notes or pulses. A second device may pick up the audio signal using a microphone, for example. The second device may recognize the distinctive pattern of the audio signal and may thereby deduce the presence of the first device. In a similar fashion, the second device may emit an audio signal which may allow the first device to identify the second device.

A first device may recognize the presence of a second device from physical or electronic contact. For example, a first device may have a port where a second device can be docked. When docked, the second device may come into electrical contact with the first device. The first device may thereby recognize the presence of the second device and/or the second device may thereby recognize the presence of the first device.

There are various ways in which one or more devices may detect the presence of one or more other devices. There are various ways in the proximity of two devices may be determined.

A first device may detect a signal from a second device. The first device may thereby detect the presence of the second device.

A first device may determine its own location. For example, the first device may use a positioning system to determine its own location. The first device may already know the location of the second device. For example, the second device may be at a well-known, fixed location. The first device may have stored in memory the location of the second device. Once the first device knows its own location and that of the second device, the first device may deduce (e.g., using geometric algorithms) when the first device is near to the second device.

A third device may detect the position of a first device, e.g., using a positioning system. The third device may know the position of a second device. The third device can then inform the first, second, or both devices of the positions of either or both of the first and second devices. The first device may thereby determine whether it is proximate to the second device. The second device may thereby determine whether it is proximate to the first device. In some embodiments, the third device may inform the first device that the first device is near the second device. In some embodiments, the third device may inform the second device that it is near the first device. In some embodiments, the third device may instruct the first device to take some action based on the fact that the first device is near to the second device, without necessarily informing the first device that the first device is near the second device. In some embodiments, the third device may instruct the second device to take some action based on the fact that the second device is near to the first device, without necessarily informing the second device that the second device is near the first device.

A third device may detect the positions of both a first device and a second device. The third device can then inform the first, second, or both devices as above. That is, the third device may inform the first and/or second devices of the first and/or second devices' positions or of the fact that the first and second devices are near to each other. The third device may also provide instructions to the first and/or to the second device based on the fact that the two devices are near to each other.

A third device may detect the position of a first device. A fourth device may detect the position of a second device. The third and fourth devices may then inform the first device of both positions. The third and fourth devices may inform the second device of both positions. The third and fourth devices may inform the first device that the first device is near the second device. The third and fourth devices may inform the second device that the first device is near the second device. The third and/or fourth devices may instruct the first device to take some action based on the fact that the first device is near the second device. The third and/or fourth devices may instruct the second device to take some action based on the fact that the first device is near the second device. The fourth device may inform the third device of the position of the second device. The third device may inform the first device of the positions of the first device and the second device. The third device may inform the first device that the first device is near the second device. The third device may inform the first device to take some action based on the fact that the first device is near the second device. The third device may inform the second device of the positions of the first device and the second device. The third device may inform the second device that the first device is near the second device. The third device may inform the second device to take some action based on the fact that the first device is near the second device.

A third device may detect the position of a first device. A fourth device may detect the position of a second device. The third and fourth devices may inform a fifth device of both positions. The fifth device may inform the first and/or second devices of both positions. The fifth device may inform the first device that it is near to the second device. The fifth device may inform the second device that it is near to the first device. The fifth device may instruct the first device to take some action based on the fact that the first device is near the second device. The fifth device may instruct the second device to take some action based on the fact that the second device is near the first device.

Game Rules Executed on the Player Interface

In various embodiments, the rules library need not reside within the gaming engine. In various embodiments, a rules library may be stored in the player interface unit 102. If there are multiple player interface units, then each player interface unit may store its own rules library and/or its own copy of a rules library. In various embodiments, some player interface units, but not necessarily all player interface units, may store their own rules libraries or copies of a rules library.

In various embodiments, a player interface unit may execute or carry out game rules according to rules stored in its rules library. The player interface unit may, when called for by the rules, request one or more random numbers form the gaming engine. The gaming engine may then supply the one or more random numbers to the player interface unit. The player interface unit may then use the one or more random numbers in accordance with game rules to arrive at a game outcome and/or a payout.

In various embodiments, a player interface unit may contain a single set of rules, such as a set of rules for one game. Thus, in various embodiments, a player interface unit need not include an entire library of rules.

In various embodiments, a player interface unit 102 may receive from the gaming engine a set of rules. The player interface unit 102 may receive the rules in the form of a string of bits or in the form of any other signal. The rules may be embodied as a computer program for the player interface unit 102 to execute. The player interface unit may then execute the rules in order to generate a game outcome and/or payout for a player.

In various embodiments, the player interface unit 102 may periodically or intermittently request from the gaming engine a new set of game rules. The new set of game rules may be game rules for a new game. The new set of game rules may be game rules for a game for which the player interface unit 102 does not already have stored rules. When the player interface unit receives a new set of game rules from the gaming engine, the player interface unit may delete any old sets of rules, such as rules for other games.

In various embodiments, a player interface unit 102 may request new game rules from the gaming engine in response to a player's request to play a new game. For example, a player at the player interface unit 102 may navigate a menu displayed by the player interface unit 102. The menu may show a selection of games that the player might choose to play. When the player chooses a game, the player interface unit 102 may request from the gaming engine 100 the rules for the game that has been selected.

In various embodiments, rules for various games may be stored separately from either the gaming engine 100 or the player interface unit 102. For example, a first server may store a rules library. A second server may include a random number circuit (such as, e.g., uniform random number circuit 104). The first server may not necessarily be located within the confines of a casino, but may instead be located remotely from a casino. For example, a server with a rules library may be located with regulators.

In various embodiments, where game rules are executed at the player interface unit 102, the same game rules may also be executed by the gaming engine 100. Further, the gaming engine and the player interface unit may receive the same random numbers. The gaming engine may thus serve as a verification that the player interface unit has correctly executed game rules, e.g., that the player interface unit has not been tampered with. Game outcomes and/or game payouts as determined by the player interface unit 102 may be periodically compared with game outcomes and/or game payouts as determined by the gaming engine. If there is a divergence in the game outcomes and/or game payouts, then the player interface unit 102 may be instructed (e.g., via signal form the gaming engine) to cease conducting games until the discrepancies may be investigated.

No Verification Algorithms

In various embodiments, the random number circuit 104 need not include verification algorithms. In various embodiments, an algorithm for generating random numbers may be tested, verified, or otherwise proved to generate numbers with desirable properties (e.g., randomness properties). The testing may be done beforehand, such as before the random number circuit 104 is deployed. With the algorithm for generating random numbers having been verified, there may be no further need to verify the outputs of the algorithm.

No Buffer

In various embodiments, random number circuit 104 does not include a buffer. Random number circuit 104 may run so quickly, for example, that sufficient random numbers may be obtained in real time. For applications where there is an extremely high demand for random numbers (e.g., where many player interface units are connected to the gaming engine via a network), a plurality of random number circuits may be employed.

Multiple Random Number Circuits

In various embodiments, there may be a plurality of random number circuits. The plurality of random number circuits may be stored or contained in the gaming engine. In various embodiments, one or more random number circuits may be stored or located in the in the gaming engine 100, and one or more random number circuits may be stored or located elsewhere. In various embodiments, one or more random number circuits may be stored or located outside the gaming engine.

Generating Random Numbers at the Player Interface Units

In various embodiments, a player interface unit may generate one or more random numbers. The random numbers may be generated specifically for a particular game, in various embodiments. The random numbers may be generated so as to be available for use in any type of game. Random numbers generated on player interface unit may be mapped to game events, game outcomes, game payouts, or any other aspect of a game. In some embodiments, random numbers from the gaming engine may be used in conjunction with random numbers from the player interface unit. For example, a random number from the player interface unit may be added to a random number from the gaming unit, thereby producing a new random number. The new random number may be used to determine an outcome of a game played at the player interface unit.

Random Number Generation

In various embodiments, a first stage of a random number generator generates a first number based on a physical process. The physical process may use atmospheric noise, quantum noise, or any other process to produce the first number. The first stage may employ a hardware random number generator, such as a random number generator which heats a diode to generate noise. The first number may then be transformed to yield a transformed first number. For example, the first number may be hashed so as to produce a transformed first number with a reduced size or with a reduced number of bits. The first random number of the transformed first random number may then serve as the input into a second stage. The second stage may utilize software in order to generate a second random number. The first random number or the transformed random number may serve as a seed for the software. The software may constitute algorithms for generating pseudo-random numbers.

In various embodiments, the first number or the transformed first number may serve as an input based on which a plurality of second numbers are generated. For example, the first number may serve as a seed. The second stage may then use the seed to generate 1000 second numbers. In this way, the quantity of numbers output by the second stage may be a multiple of the quantity of numbers output by the first stage. This may allow the two-stage system as a whole to generate large quantities of random numbers even if the first stage of the random number generator cannot supply such a large quantity on its own.

First numbers or transformed first numbers which are generated in the first stage of the random number generator may be stored in a first buffer. The first buffer may be a semiconductor memory or other storage medium. The first buffer may store one or more first numbers (i.e., numbers generated by the first stage) until such numbers are used by the second stage, in which case the one or more first numbers may be discarded. In some embodiments, one or more first numbers may be discarded (e.g., erased from memory) from a buffer even when such numbers have not been used in the second stage of the random number generator. For example, after a certain period of elapsed time from when a first number has been generated, the first number may be discarded. In some embodiments, a first number in a buffer may be discarded when the buffer has filled up (e.g., with numbers which have been generated after the first number).

In some embodiments, second numbers which are output from the second stage of the random number generator are stored in a second buffer. The second numbers are then available for use in games, such as games of chance. For example, a slot machine may request one or more second numbers from the second buffer for use in generating an outcome of a slot machine game. Once second numbers are provided, e.g., to a slot machine, such numbers may be eliminated from the buffer. In some embodiments, the second numbers are eliminated from the second buffer even when they have not been used. In some embodiments, second numbers may be eliminated from the second buffer a predetermined period of time after they have been generated. In some embodiments, the second numbers may be eliminated from the second buffer when the second buffer has been filled, e.g., with new second numbers.

Supply of Correct Number of Bits

In various embodiments, a random number generator may produce random bits. That is, the random number generator may produce 1's and 0's (with equal probability), with each bit independent of every other bit. The random number generator may store a sequence of random bits in a buffer, such as the second buffer described above.

In various embodiments, as game rules are executed (e.g., by the main control circuit 101), one or more random bits may be drawn from the buffer storing the sequence of random bits. In various embodiments, only enough bits may be drawn from the buffer to satisfy the requirements of the game rule. For example, the game rule may require a random number in the range 1 to 64. Accordingly, six bits may be drawn from the buffer. The six bits may take on 64 possible sequences of 1's and 0's, and thus may be mapped to a random number in the range of 1 to 64. Another game rule may require a random number in the range of 1 to 8. Accordingly, three bits may be drawn from the buffer in order to obtain a random number in the range of 1 to 8.

In various embodiments, a random number may be required by game rules. The random number may be a number chosen from a range that does not include a number of possibilities that is a power of two. For example, game rules may require a random number in the range of 1 to 3. In some embodiments, a number of bits may be drawn from the buffer, where the number of bits may represent a range which is the next power of two above the required range. For example, the next power of two greater than 3 is 4. the next power of two greater than 9 is 16. Thus, to generate a random number in the range of 1 to 3, enough bits are obtained to generate a number in the range of 1 to 4. To generate a number in the range of 1 to 9, enough bits are obtained to generate a number in the range of 1 to 16, and so on. The obtained bits may be mapped to a number. If the number falls within the desired range (e.g., 1 to 3), then the game rule has been satisfied. However, if the obtained bits map to a number outside the range (e.g., the obtained bits map to the number 4 when the game rules require a number in the range of 1 to 3), then a new set of bits may be drawn (with the old set of bits discarded) and the mapping done again. New bits may be drawn until there is a successful mapping of the obtained bits into the desired number range.

Random Number Generation Embodiments

Various embodiments use random numbers for the following functions:

Game outcome generation

Encryption key generation

Encryption communication packed padding

Various embodiments employ one or more Hardware random number generators (RNGs), such as SG100s, in concert with a Software Random Number Generator.

Hardware Random Number Generator (HRNG)

The HRNG used in various embodiments is the SG100, produced by Protego Information AB of Sweden. As of July, 2007, information about the SG100 could be found at: http://www.protego.se/sg100_en.htm.

This device exploits quantum mechanical noise generated by a diode to generate theoretically true random numbers. Since the SG100 generates a stream of theoretically genuine random numbers, it may be desirable in various embodiments to use only SG100s for all random numbers generated. However, the throughput of this device may not be sufficient to guarantee an uninterrupted supply of random numbers, in various embodiments.

Accordingly, the HRNGs may be used for the following functions:

Initializing the Software Random Number Generators

Supplementing the output of the Software Random Number Generators

Initializing the SRNG

In various embodiments, each server host has its own SG100 device to initialize the software RNG. When the RNG subsystem starts, it utilizes the presence of a working HRNG to initialize the SRNG.

Supplementing the Supply of Random Numbers

Once the SRNG has been initialized, the HRNG output continues to provide a source of entropy for the SRNG, thereby helping to ensure the randomness of the output.

Software Random Number Generator (SRNG)

The Software Random Number Generator (SRNG) may be implemented as a number of Java classes and C files. The SRNG accepts the SG100 output via the add entropy method. The SRNG may be designed to accept one or more sources of entropy, e.g. multiple SG100s.

Algorithm

Reading from the hardware RNG, according to some embodiments.

1. Data is read from the serial port in 4096-byte blocks
2. This entropy of this data is calculated, and checked against a threshold
3. Four more blocks of 4096 bytes are read and checked for entropy, and the primary block is XOR-ed with each of these in turn
4. The output of this process will be referred to as XORed HRNG data Initializing the RNG, according to some embodiments.

1. Each hardware RNG device is activated, and 4096 bytes are directly read from the device and discarded, to avoid startup anomalies
2. XOR-ed HRNG data from each device into its own cache, until the cache is filled
3. A separate thread is started for each device, which continually polls the device for more data
4. As XOR-ed HRNG data is produced, it is initially added to the cache. If the cache is already full, the numbers are added directly to the entropy pool
5. The system keeps an "entropy count", which represents the number of bytes that can be read from the SRNG before more HRNG data must be added to the entropy pool. This count is initially zero.

Extracting Random Numbers

When the system requests random numbers, the SRNG checks the entropy count. If it is less than the requested number of bytes, it is reset to zero, and HRNG data from the cache is added to the entropy pool. The entropy count is then updated in one of two ways:

a. If the number of bytes remaining in the cache is above a pre-set threshold, the entropy count is incremented by the number of bytes added.
b. If below the threshold, the entropy count calculation is incremented in a linearly increasing manner (as the cache size decreases), such that the last byte produces an entropy count of 8192. (This allows for a further 8000+ random bytes to be produced before stopping to wait for more HRNG data.)

2. The SRNG then generates the requested number of bytes from the entropy pool, and the entropy count is reduced by the number of bytes read.
3. The entropy count is adjusted so that it does not exceed the number of bytes requested, and the requested random numbers are returned.

Cryptographic Security

The cryptographic security of the RNG system may be enhanced by:

a. Initializing the SRNG from a HRNG
b. Having a large period on the SRNG

Various SRNG implementations use an 8 Kb mixing pool, providing a period on the order of 28192. This extremely high period provides for a lengthy unique number stream, even in the event that no entropy is added to the pool after startup/initialization, e.g. if the HRNG device fails at some arbitrary point in time after startup.

Despite this, the SRNG may impose an artificial limit on the number of bytes that may be read without the addition of entropy into the pool. When the system is lightly loaded and the HRNG is functioning correctly, random numbers may be consumed at or below the rate that the HRNG provides entropy.

Under extreme loads (or after an HRNG malfunction), the buffer of hardware numbers may approach depletion. In various embodiments, at a pre-set threshold, the proportion of numbers read from the SRNG for each HRNG byte added is gradually increased, such that once the last byte from the HRNG is consumed, only a further 8192 bytes of data may be read from the SRNG. At this further game play may be prevented until the HRNG is replaced or fixed.

The HRNG and SRNG combination provides for continual addition of entropy to the SRNG pool, at whatever rate can be provided by the HRNG. If the SRNG algorithm were to be removed, and only this source of entropy used, this would provide a cryptographically unique stream of random numbers, even to a single player.

Moreover, as soon as additional players are connected to a host, additional entropy comes into play, i.e. the unpredictability of when the other player(s) will play their next game.

Therefore, there are four sources of randomness inherent in the WGS RNG system. In addition to the two sources cited above, the following may be added:

c. The continuing output of the SG100s; and
d. when multiple players are online, the unpredictability of other players' actions 4. Fault Tolerance The RNG system within the WGS caters for the possibility of HRNG device failure as follows:

When an SG100 is removed or fails in some way, an SNMP message is generated to notify System Administrators. The devices are "hot swappable", so System Administrators can simply plug a replacement SG100 into the host so that it can continue mixing additional entropy into the SRNG output.

Two or more SG100 devices can potentially be used at the same time on each host for failure redundancy Entropy testing, as described below.

4.1 HRNG Entropy Testing

See Section 6 for an explanation of entropy measurements.

In order to guard against hardware failures, blocks of data are discarded whose entropy falls below a certain threshold. A hardware failure is detected when no data whose entropy is above the threshold was received in a period of (currently) 60 seconds.

The choice of the entropy threshold of 70% on 4K blocks is intended to minimise the discarding of genuine random data. A 'true' random number generator would generate contiguous blocks of zeros of any length. However, the probability of such an event is extremely low (less than 10-30 for our threshold of 70%). Furthermore, because the results are XORed with other HRNG output, the side effects of discarding low entropy but genuine random numbers are almost totally removed.

5. Scalability

Ideally, the RNG on each host should scale its throughput to match demand without requiring human intervention (e.g. adding or changing physical devices). This requirement is met by the current design, which is capable of obtaining most of its random numbers from the SRNG. Since the SRNG code is relatively inexpensive to execute (in terms of system resources), the supply of random numbers should never become a bottleneck on the system throughput.

5.1 High Throughput

It is desirable to minimize the number of server hosts required at any given site. A modern mid-range to enterprise server running a USS for example, could cater for say 500 simultaneous players. In comparison, a SUN Ultra5 would have a practical limit of about 220 simultaneous players.

6. Theory

The following text is extracted from the Wikipedia entry on information entropy

Claude Shannon defined entropy as a measure of the average information content associated with a random outcome. Shannon's definition of information entropy makes this intuitive distinction mathematically precise. His definition satisfies these desiderata:

The measure should be continuous—i.e., changing the value of one of the probabilities by a very small amount should only change the entropy by a small amount.

If all the outcomes (ball colours in the example above) are equally likely, then entropy should be maximal.

If the outcome is a certainty, then the entropy should be zero.

The amount of entropy should be the same independently of how the process is regarded as being divided into parts.

Shannon defines entropy in terms of a discrete random variable X, with possible states (or outcomes) x1 . . . xn as:

where is the probability of the ith outcome of X.

That is, the entropy of the event x is the sum, over all possible outcomes i of x, of the product of the probability of outcome i times the log of the inverse of the probability of i (which is also called i's surprisal—the entropy of X is the expected value of its outcome's surprisal). We can also apply this to a general probability distribution, rather than a discrete-valued event.

Shannon shows that any definition of entropy satisfying his assumptions will be of the form:

where K is a constant (and is really just a choice of measurement units).

Storing Numbers Particular to Individual Games on the Server

In various embodiments, the gaming engine 100 or a component thereof (e.g., the random number circuit 104), may store different sets of random numbers. Each set of random numbers may be particular to one or more games. For example, the gaming engine 100 may store a set of random number suitable for use in card games. For example, the set of random numbers may include numbers in the range of 1 to 52, such that each possible number in the range can be mapped to a card. The gaming engine may also store another set of random numbers which includes random numbers in the range of 1 to 1 million. This set of random numbers may be used for determining an outcome of a slot machine game in which there are thousands of possible outcomes. Additional sets of random numbers may also be stored.

When particular game rules are executed, these rules may specify from which set of random numbers to draw a random number. For example, rules for a poker game may specify that a random number should be taken from the set containing random numbers in the range of 1 to 52. The rules for a slot machine game may specify that a random number should be taken from the set containing random numbers in the range of 1 to 1 million.

In various embodiments, random numbers particular to an individual game or set of games may be stored in their own buffer. The buffer may be a semi-conductor memory device, or a portion of a memory device, for example. Thus, there may be a plurality of buffers, each storing random numbers particular to different games or sets of games. When game rules are executed, the rules may specify from which buffer to draw random numbers in order to satisfy the rules of the game. In some embodiments, game rules may specify the nature of random numbers that are required (e.g., game rules may specify the range in which a random number must fall), and the gaming engine or other logic may determine the appropriate buffer from which to draw random numbers.

In various embodiments, random numbers may be stored as sequences of bits. For example, there may be 1-bit random numbers stored, 2-bit random numbers stored, 3-bit random numbers stored, and so on. Each type of random number may be stored in a different location, such as in a different buffer. Various game rules may then request random numbers of the appropriate length in bits. For example, game rules for a first game may request 10 numbers, each of three bits. Game rules for a second game may request 8 numbers, each of five bits.

In various embodiments, numbers of different bit lengths may be stored. However, only numbers of bit lengths required by games may be stored. For example, if there exist games that, as a group, require numbers of 4 bits, 6 bits, and 8 bits, then 4-bit, 6-bit, and 8-bit random numbers may be generated and stored. However, numbers of 3-bits, 5-bits and 7-bits may not be stored. Thus, the gaming engine may generate and store only those random numbers that may be required by game rules of one or more games.

In various embodiments, random numbers may not be stored. However, random numbers may be generated upon request when necessitated by game rules. The gaming engine may include two or more random number generators. Each random number generator may be configured to generate numbers useful in a particular game or set of games. For example, a first random number generator may be configured to generate random numbers in the range of 1 to 52, while a second random number generator may be configured to generate random numbers in the range of 1 to 1 million. The appropriate random number generator may be activated to generate one or more random numbers based upon which game requires a random number at a given point in time. Thus, random number generators may exist which generate numbers particular to one or more games. Random numbers generated by such generators may not be useful, or immediately useful, for other games.

Various Embodiments

The following are embodiments, not claims:

A. A method for playing a plurality of different games at a player interface unit comprising the steps of:

receiving a player record of information from the player interface unit when a player playing a selected one of the plurality of different games initiates a game event;

determining game rules for the selected one game corresponding to the delivered player record of information;

generating a first set of random numbers for use in a first subset of the plurality of different games;

generating a second set of random numbers for use in a second subset of the plurality of different games;

determining that the selected one game is one of the first subset of the plurality of different games;

obtaining random numbers from the first set of generated random numbers when required by the determined game rules;

delivering to the player interface unit game play results in response to the determined game rules and obtained random numbers; and implementing the game play results in the player interface unit so as to respond to the player initiated game event for the selected one game.

B. The method of embodiment A in which the first subset of the plurality of games includes card games. For example, the first subset of the plurality of games may include video poker and video blackjack.

C. The method of embodiment B in which generating a first set of random numbers includes generating a first set of random numbers in the range of 1 to 52 for use in the first subset of the plurality of games. In some embodiments, the first set of random numbers may be generated in any range spanning 52 integers. For example, the first set of random numbers may be generated in the range of 0 to 51, or in the range of 101 to 151. The numbers in the first set of random numbers may be used to select cards to be used in a game of the first subset of the plurality of games.

D. The method of embodiment A in which the first subset of the plurality of games includes video poker games. In various embodiments, the first subset of the plurality of games may include two or more varieties of video poker, such as Jacks or Better Video Poker, Deuces Wild Video Poker, and other varieties of video poker.

E. The method of embodiment D in which determining that the selected one game is one of the first subset of the plurality of different games includes determining that the selected one game is a video poker game.

F. The method of embodiment A in which generating a first set of random numbers includes generating a first set of random numbers for use in a first game of the plurality of games. For example, the first subset of the plurality of different games may constitute only a single game (e.g., Jacks or Better Video Poker), and thus the first set of random numbers may be generated for use only in that one game, in some embodiments.

G. The method of embodiment A in which generating a first set of random numbers includes generating a first set of random numbers for use in a particular slot machine game of the plurality of games.

H. The method of embodiment A in further including:

storing the first set of random numbers in a first buffer; and storing the second set of random numbers in a second buffer.

For example, the first set of random numbers may be stored in a first semi-conductor memory device, and the second set of random numbers may be stored in a second semi-conductor memory device. As another example, the first set of random numbers may be stored in a first area of a computer memory, and the second set of random numbers may be stored in a second area of computer memory.

I. The method of embodiment A in which each number in the first set of random numbers is generated so as to fall within a first range and in which each number in the second set of random numbers is generated so as to fall within a second range, in which the first range is different from the second range. For example, the first range may be the range 1 to 52, while the second range may be the range 1 to 10,000. Thus, each number in the first set of random numbers may be between 1 and 52, while each number in the second range may be between 1 and 10,000.

J. A method for playing a plurality of different games at a mobile gaming device comprising the steps of:

receiving a player record of information from the mobile gaming device when a player playing a selected one of the plurality of different games initiates a game event;

determining game rules for the selected one game corresponding to the delivered player record of information;

generating random numbers independent of the game rules for the plurality of different games;

obtaining random numbers from the generated random numbers when required by the determined game rules;

delivering to the mobile gaming device game play results in response to the determined game rules and obtained random numbers; and implementing the game play results in the mobile gaming device so as to respond to the player initiated game event for the selected one game.

K. The method of embodiment J in which the mobile gaming device is one of: (a) a cellular phone; (b) a personal digital assistant; (c) a personal data assistant; (d) a portable music player; (e) a laptop computer; (f) a pager; (g) an Apple iPod; and (h) a Blackberry of Research In Motion.

L. The method of embodiment J in which receiving a player record of information includes wirelessly receiving a player record of information from the mobile gaming device when a player playing a selected one of the plurality of different games initiates a game event.

M. The method of embodiment J in which delivering includes transmitting game play results via wireless communication to the mobile gaming device in response to the determined game rules and obtained random numbers.

N. A method for playing a plurality of different games at a player interface unit comprising the steps of:

receiving a player record of information from the player interface unit when a player playing a selected one of the plurality of different games initiates a game event;

determining game rules for the selected one game corresponding to the delivered player record of information;

generating a plurality of random bits;

determining a quantity, in which the quantity represents a quantity of bits required by the determined game rules;

obtaining from the plurality of random bits the quantity of bits;

delivering to the player interface unit game play results in response to the determined game rules and obtained quantity of bits; and implementing the game play results in the player interface unit so as to respond to the player initiated game event for the selected one game.

The quantity may be a quantity such as “1”, “2”, “10”, “20”, or any other quantity. This may represent a quantity of bits required by the determined game rules. Thus, for example, the determined game rules may require 1 bit, 2 bits, 10 bits, 20 bits, or any other quantity of bits.

O. The method of embodiment N further including storing the plurality of random bits in a buffer.

P. The method of embodiment O in which obtaining includes obtaining the quantity of bits from the buffer.

Q. The method of embodiment P further including removing the quantity of bits from the buffer. For example, once the bits have been used for a game, the bits may be deleted or erased, such as erased from computer memory.

R. The method of embodiment N in which determining a quantity includes:

determining a range, in which the range sets boundaries on the values of a random number required by the determined game rules; and determining a quantity, in which the quantity of bits can be mapped to any number within the range.

The quantity may represent enough bits that a particular combination of bit values can map to any number within the range. For example, 2 bits can, depending on the values of the bit (e.g., "0" or "1") map to any number in the range of 1 to 4. Similarly, 4 bits can map to any number in the range of 1 to 16.

S. The method of embodiment N in which generating the plurality of random bits includes generating the plurality of random bits prior to receiving the player record of information. Thus, random bits may be generated and available for use in a game even before the game has been initiated.

T. The method of embodiment N in which generating a plurality of random bits includes generating a plurality of independent random bits. In various embodiments, each random bit may be generated according to a random or pseudo-random process so as to be statistically independent of every other bit. Each bit may be generated according to a uniform distribution (e.g., "0" and "1" may be equally likely). In some embodiments, bits are generated according to a non-uniform distribution.

Incorporation by Reference

U.S. Pat. No. 6,210,274, entitled "Universal gaming engine" is hereby incorporated by reference herein for all purposes.

What is claimed is:

1. A method for playing games at two or more player mobile devices of an electronic gaming system, comprising the steps of:

computing, by a gaming system computer, pairs of the player mobile devices are in proximity to each other;

distributing random numbers from a central random number generating device to one or more computers for computation of play at player mobile devices that are computed to be proximate to each other;

distributing to the player mobile devices respective rule descriptions for play of games by players at the player mobile devices, the games being games of wagering for value;

computing an action to be taken by at least one of the player mobile devices, based at least in part on the computation of which player mobile devices are in proximity to each other, the random numbers distributed for computation of play at the respective player mobile devices, and the rule descriptions distributed to the respective player mobile devices.

2. The method of claim 1 in which at least one of the games for which rules are distributed includes card games.

3. The method of claim 1 in which at least one of the games for which rules are distributed includes video poker games.

4. The method of claim 3 in which determining that the selected one game is one of the first subset of the plurality of different games includes determining that the selected one game is a video poker game.

5. The method of claim 1 in which at least one of the games for which rules are distributed includes a slot machine game.

6. The method of claim 1 in which the central random number generating device is programmed to generate random numbers for a first of the player mobile devices to fall within a first range and to generate random numbers for a second of the player devices to fall within a second range, in which the first range is different from the second range.

7. The method of claim 1, further comprising the step of:

obtaining random numbers from the random number generation device when required by the game rules associated with the respective player mobile devices.

8. The method of claim 1 in which the player mobile device is one of: (a) a cellular phone; (b) a personal digital assistant; (c) a personal data assistant; (d) a portable music player; (e) a laptop computer; and (f) a pager.

9. The method of claim 1, further comprising the step of:

obtaining random numbers from the random number generation device when required by the game rules associated with the respective player mobile devices.

10. An electronic gaming system, comprising:

a plurality of player mobile gaming devices designed to receive respective rule descriptions for play of games by players at the player mobile devices;

one or more computers programmed to compute whether pairs of the player mobile devices are in proximity to each other;

a central random number generating device designed to compute random numbers for distribution to computers for computation of play at the player mobile devices;

one or more computers programmed to compute actions to be taken by at least one of the player mobile devices, the actions computed based at least in part on the computation of which player mobile devices are in proximity to each other, the random numbers distributed for computation of play at the respective player mobile devices, and the rule descriptions distributed to the respective player mobile devices.

11. The electronic gaming system of claim 10 in which at least one of the games for which rules are distributed includes card games.

12. The electronic gaming system of claim 10 in which at least one of the games for which rules are distributed includes video poker games.

13. The electronic gaming system of claim 12 in which determining that the selected one game is one of the first subset of the plurality of different games includes determining that the selected one game is a video poker game.

14. The electronic gaming system of claim 10 in which at least one of the games for which rules are distributed includes a slot machine game.

15. The electronic gaming system of claim 10 in which the central random number generating device is programmed to generate random numbers for a first of the player mobile devices to fall within a first range and to generate random numbers for a second of the player devices to fall within a second range, in which the first range is different from the second range.

16. The electronic gaming system of claim 10 in which the player mobile device is one of: (a) a cellular phone; (b) a personal digital assistant; (c) a personal data assistant; (d) a portable music player; (e) a laptop computer; and (f) a pager.

* * * * *